(12) United States Patent
Ito et al.

(10) Patent No.: US 11,460,864 B2
(45) Date of Patent: Oct. 4, 2022

(54) MOVING BODY GUIDANCE SYSTEM, MOVING BODY, GUIDANCE DEVICE, AND COMPUTER PROGRAM

(71) Applicant: Nidec Corporation, Kyoto (JP)

(72) Inventors: Junji Ito, Kyoto (JP); Huashi Liu, Kyoto (JP); Tomohiko Tomogane, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 243 days.

(21) Appl. No.: 16/317,155

(22) PCT Filed: Jul. 27, 2017

(86) PCT No.: PCT/JP2017/027183
§ 371 (c)(1),
(2) Date: Jan. 11, 2019

(87) PCT Pub. No.: WO2018/021457
PCT Pub. Date: Feb. 1, 2018

(65) Prior Publication Data
US 2019/0227571 A1    Jul. 25, 2019

(30) Foreign Application Priority Data

Jul. 29, 2016   (JP) .............................. JP2016-149774

(51) Int. Cl.
*G05D 1/02* (2020.01)
*G08G 1/00* (2006.01)

(52) U.S. Cl.
CPC .............. *G05D 1/0297* (2013.01); *G05D 1/02* (2013.01); *G05D 1/0274* (2013.01); *G05D 1/0282* (2013.01); *G08G 1/20* (2013.01)

(58) Field of Classification Search
CPC ...... G05D 1/0297; G05D 1/02; G05D 1/0274; G05D 1/0282; G08G 1/20
See application file for complete search history.

(56) References Cited

U.S. PATENT DOCUMENTS 4,940,925 A    7/1990   Wand et al.
6,092,010 A    7/2000   Alofs et al.
(Continued)

FOREIGN PATENT DOCUMENTS

CN    1573735 A    2/2005
CN    1771426 A    5/2006
(Continued)

OTHER PUBLICATIONS

Official Communication issued in International Patent Application No. PCT/JP2017/027183, dated Oct. 24, 2017.
(Continued)

*Primary Examiner* — Nicholas Kiswanto
*Assistant Examiner* — Jamal A Shah
(74) *Attorney, Agent, or Firm* — Keating & Bennett

(57) ABSTRACT

A vehicle guidance system includes vehicles, a positioning device to measure a location of each of the vehicles and output location information of the vehicles; a guidance device to generate, for each vehicle, a guidance command to guide the vehicle; and a storage device to store a guide command for each vehicle. The guidance device generates a guidance command including location information of points of passage defining a traveling path for each vehicle, stores the guidance command to the storage device, and, when at least some of the points of passage are to be altered, stores altered location information of points of passage to the storage device. Each vehicle accesses the storage device to acquire, from the storage device, the altered location information of points of passage.

20 Claims, 25 Drawing Sheets

(56) References Cited

U.S. PATENT DOCUMENTS

| | | | |
|---|---|---|---|
| 2002/0095239 A1* | 7/2002 | Wallach | G05D 1/0295 700/245 |
| 2004/0260457 A1 | 12/2004 | Kawase et al. | |
| 2006/0271274 A1 | 11/2006 | Saarikivi | |
| 2012/0316722 A1 | 12/2012 | Zeitler et al. | |
| 2013/0211708 A1 | 8/2013 | Takahashi | |
| 2014/0316633 A1* | 10/2014 | Tsujimoto | G05D 1/0261 701/23 |
| 2014/0336815 A1 | 11/2014 | Barwick et al. | |
| 2016/0129592 A1 | 5/2016 | Saboo et al. | |
| 2017/0124862 A1* | 5/2017 | Sakai | G01C 21/20 |
| 2017/0227962 A1* | 8/2017 | Cesarano | H04B 7/18506 |
| 2017/0229029 A1* | 8/2017 | Klinger | G01S 13/02 |
| 2017/0286887 A1* | 10/2017 | Moran | G08G 5/0026 |

FOREIGN PATENT DOCUMENTS

| | | |
|---|---|---|
| CN | 102346483 A | 2/2012 |
| CN | 102955476 A | 3/2013 |
| CN | 203038110 U | 7/2013 |
| CN | 103238042 A | 8/2013 |
| CN | 103309350 A | 9/2013 |
| CN | 105302139 A | 2/2016 |
| CN | 105468005 A | 4/2016 |
| EP | 0 213 939 A2 | 3/1987 |
| EP | 0 261 081 A2 | 3/1988 |
| EP | 2 952 928 A1 | 12/2015 |
| JP | 07-55913 A | 3/1995 |
| JP | 09-230933 A | 9/1997 |
| JP | 11-154013 A | 6/1999 |
| JP | 2003-029830 A | 1/2003 |
| JP | 2004-280213 A | 10/2004 |
| JP | 2005-018248 A | 1/2005 |
| JP | 2013-101487 A | 5/2013 |
| JP | 2015-230527 A | 12/2015 |
| KR | 10-1440565 B1 | 9/2014 |
| WO | 85/05474 A1 | 12/1985 |
| WO | 2008/035433 A1 | 3/2008 |

OTHER PUBLICATIONS

"Parking in the Future: Intelligent Sensors Control Autonomous Parking Robot", http://www.sickinsight-online.com/parking-in-the-future-intelligent-sensors-control-autonomous-parking-robot/, Jul. 2, 2014, pp. 1-5.

* cited by examiner

| LOCATION | ID=100063 |
|---|---|
| A | dA, θA |
| B | dB, θB |
| C | dC, θC |
| D | dD, θD |
| E | dE, θE |
| F | dF, θF |

| LOCATION | ID=100063 |
|---|---|
| A | dA, θA |
| B | dB, θB |
| C* | dC*, θC* |
| D | dD, θD |
| E* | dE*, θE* |
| F* | dF*, θF* |

| LOCATION | ID=100063 |
|---|---|
| A | dA, θA |
| B | dB, θB |
| C | dC, θC |
| D | dD, θD |
| E | dE, θE |
| F | dF, θF |

| LOCATION | ID=100063 |
|---|---|
| A | dA, θA |
| B | dB, θB |
| C | dC, θC |
| D | dD, θD |
| E | dE, θE |
| F | dF, θF |
| X | dX, θX |
| Y | dY, θY |

FIG.25

| LOCATION | ID=100063 | AUDIO OUTPUT FLAG |
|---|---|---|
| A | dA, θA | 0 |
| B | dB, θB | 0 |
| C | dC, θC | 1 |
| D | dD, θD | 0 |
| E | dE, θE | 0 |
| F | dF, θF | 0 |

MOVING BODY GUIDANCE SYSTEM, MOVING BODY, GUIDANCE DEVICE, AND COMPUTER PROGRAM

BACKGROUND OF THE INVENTION

1. Field of the Invention

The present disclosure relates to a vehicle guidance system, a vehicle, a guidance device, and a computer program.

2. Description of the Related Art

Automated guided vehicles and systems for controlling movement of automated guided vehicles are under development. Automated guided vehicles may also be called "AGVs".

International Publication No. 2008/035433 discloses a vehicle which has a tag communication section. A plurality of IC tags having respective pieces of location information are distributed over an area for travel. As a vehicle travels, the tag communication section performs wireless communications with the IC tags to read location information of the IC tags. Through this, the vehicle acquires information of its current location, thereby being able to perform automated travel.

Japanese Laid-Open Patent Publication No. 11-154013 discloses a system which causes an AGV to move to a designated location. An AGV reads location markers representing locations, and in moving to a designated location, if its location is deviated, makes a correction by using its own navigation system.

A conventional AGV performs sophisticated control while individually collecting data indicating the location of itself, and autonomously travels toward a destination. The fact that such an AGV needs a high-performance processor, a large-capacity memory, high-performance sensors, and the like, has led to a high system cost.

For example, in both of the techniques of International Publication No. 2008/035433 and Japanese Laid-Open Patent Publication No. 11-154013, IC tags or location markers that are needed to detect locations are disposed within an area for travel, for the AGV to detect its own current location and utilize for autonomous travel. A reader device for reading location information and devices for performing autonomous travel by utilizing such location information are needed, thus leading to a high cost of the AGV.

Moreover, as the number of AGVs performing autonomous travel increases, problems may arise that cannot be avoided simply by each individual AGV performing autonomous travel, e.g., collision between AGVs and deadlocks. If mutual communications were to be performed between AGVs in order to avoid such problems, further cost would be required for the mutual communications.

SUMMARY OF THE INVENTION

One non-limiting and exemplary embodiment of the present application provides an AGV, as well as a control system for AGVs, that is able to be provided and operated at low cost.

In an illustrative embodiment, a vehicle guidance system according to the present disclosure is a vehicle guidance system for guiding each of a plurality of vehicles, the vehicle guidance system including a plurality of vehicles, a positioning device to measure a location of and output location information for each of the plurality of vehicles, a guidance device to generate, for each vehicle, a guidance command to guide the vehicle, and a storage device to store a guide command for each vehicle; each vehicle including a first communication circuit to communicate with each of the guidance device and the storage device, a power source to generate driving power, and a controller to control the power source in accordance with the guidance command to move the vehicle; the guidance device including a signal processing circuit to generate the guidance command and a second communication circuit to communicate with each of the storage device and the vehicle, wherein the guidance device generates the guidance command so as to include location information of points of passage defining a traveling path for each vehicle, storing the guidance command to the storage device, and, when at least a portion of the plurality of points of passage is to be altered, storing altered location information of points of passage to the storage device; and each vehicle accesses the storage device to acquire from the storage device the altered location information of points of passage.

In an illustrative embodiment, a guidance device according to the present disclosure includes a communication circuit; and a signal processing circuit, wherein the signal processing circuit generates a guidance command to guide each of a plurality of vehicles, the guidance command including location information of a plurality of points of passage defining a traveling path for each vehicle; the communication circuit transmits the guidance command to an external storage device, and receives location information of each vehicle as measured by a positioning device; the signal processing circuit alters at least a portion of the plurality of points of passage based on location information of each vehicle moving in accordance with the guidance command; and the communication circuit transmits altered location information of points of passage to the external storage device.

In an illustrative embodiment, a vehicle according to the present disclosure includes a communication circuit to acquire a guidance command from an external storage device; a power source to generate driving power; and a controller to control the power source in accordance with the guidance command to move the vehicle itself, wherein, the guidance command includes location information of a plurality of points of passage defining a traveling path for the vehicle itself; and, during a move in accordance with the guidance command, or after arriving at one of the plurality of points of passage, the communication circuit acquires location information of points of passage in which at least a portion of the plurality of points of passage is altered, from the storage device.

In an illustrative embodiment according to the present disclosure, a non-transitory computer readable medium includes a computer program that is executed by a computer of a vehicle, and a computer of a guidance device, to cause the vehicle and the guidance device to each operate as described above.

In a vehicle guidance system according to one exemplary implementation of the present invention, a guidance device performs: generating a guidance command including location information of a plurality of points of passage defining a traveling path for each vehicle; storing the guidance command to the storage device; and, when at least a portion of the plurality of points of passage is to be altered, storing altered location information of points of passage to the storage device. Before beginning a move, each vehicle is able to access the storage device to acquire the guidance command from the storage device. When location information of points of passage has been altered, each vehicle is able to access the storage device with an appropriate timing to acquire altered location information of points of passage from the storage device. In the case where the guidance command was not altered, or access to the storage device cannot be made for some reason, the vehicle is able to move in accordance with a guidance command that has already been acquired.

The vehicle does not need any device, etc., for acquiring location information. There is also no need to install in an area for movement for the vehicle any IC tags or the like that store location information. As a result, the cost for introducing the system, including the vehicle cost, is able to be reduced.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 25 is a diagram showing an exemplary guidance command having an audio output flag.

DETAILED DESCRIPTION OF THE PREFERRED EMBODIMENTS

Figure 1:
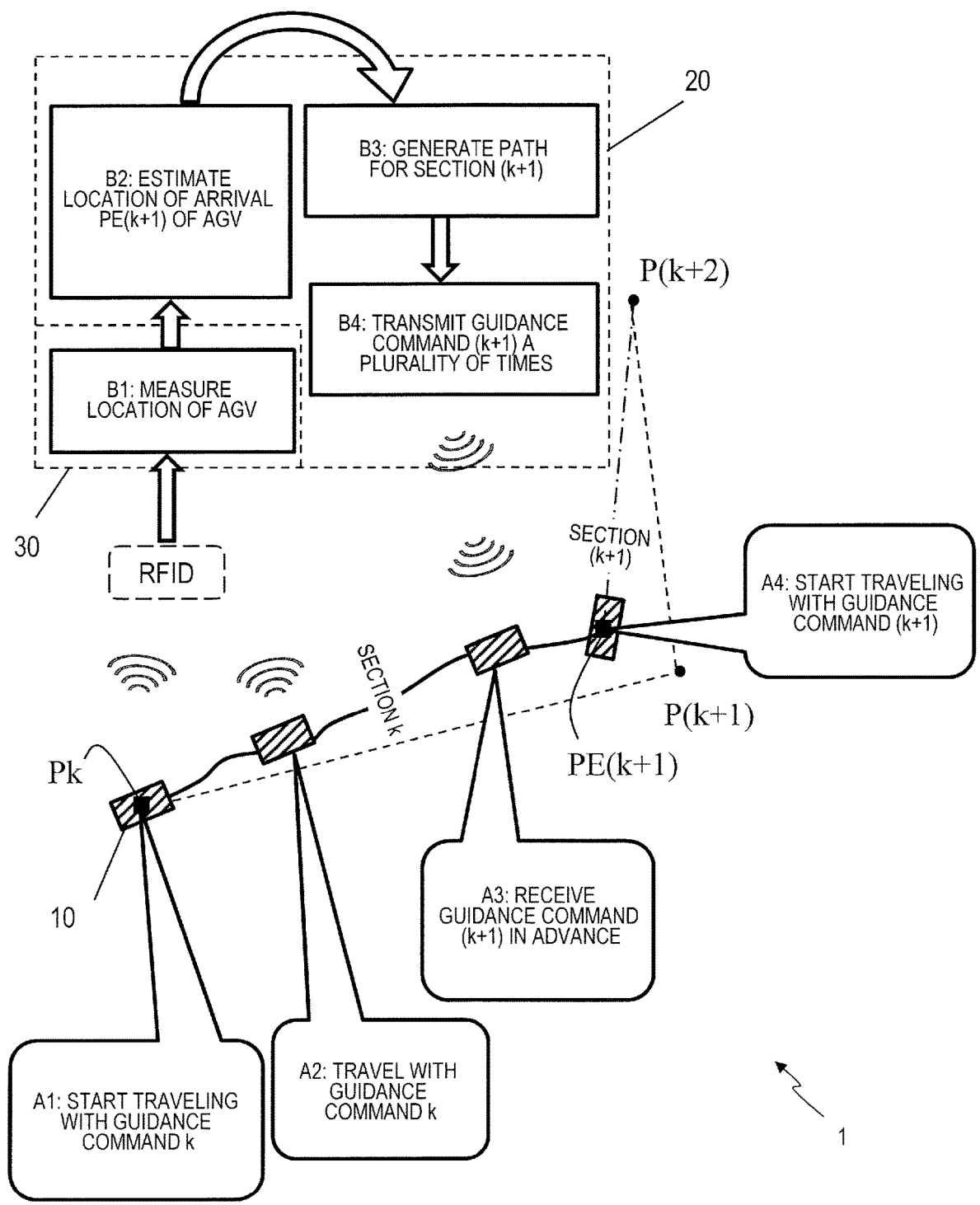
FIG. 1 shows an operation of a vehicle guidance system 1 in outline.

Hereinafter, vehicle guidance systems according to exemplary embodiments of the present disclosure will be described. In vehicle guidance system according to the exemplary embodiments of the present disclosure, the respective location(s) of one or more vehicles is/are measured by a positioning device that is provided external to the vehicle(s). The guidance device transmits a guidance command to each vehicle to cause the vehicle to move to a target location. During the move, each vehicle does not need to measure its own location. The vehicle may be an automated guided vehicle (AGV), a cart or wheelchair that is capable of autonomous travel, an automatically or autonomously-driven car, a robot, a multicopter, or a service robot, for example. A "location" may be a location within a two-dimensional plane, or a location within a three-dimensional space.

In a vehicle guidance system according to the present disclosure, it is possible to guide a very large number of vehicles while reducing the communications load and processing load.

Specifically, in the guidance device of the vehicle guidance system, a guidance command containing location information of a plurality of points of passage defining a traveling path for each vehicle is generated and stored to a storage device in advance. Each vehicle acquires a guidance command from the storage device, and begins traveling.

When at least a portion of the plurality of points of passage is to be altered after the guidance command is generated, the guidance device alters the location information of points of passage. Each vehicle may access the storage device with an appropriate timing to acquire the altered location information of points of passage from the storage device.

In one implementation, to a vehicle which had its location information of points of passage altered, the guidance device gives a notification that such an alteration has been made, and only the vehicle that has received the notification may access the storage device to acquire the altered location information. As compared to an implementation where all vehicles check for updates on a regular basis, the processing of the present embodiment imposes a very light communications load, and the processing load for the storage device can be suppressed.

In the case where the guidance command was not altered, or access to the storage device cannot be made for some reason, the vehicle is able to move in accordance with a guidance command that has already been acquired.

Each vehicle does not need any device, etc., for acquiring location information. There is also no need to install in an area for movement for the vehicle any IC tags or the like that store location information. As a result, the cost for introducing the system, including the vehicle cost, can be reduced.

In the present disclosure, AGVs are exemplified as vehicles. An AGV is an unguided car which autonomously travels while carrying products, parts, etc., and transporting them unmannedly to a predetermined place. An AGV may be referred to as a transport robot.

Hereinafter, a fundamental AGV guidance operation using a vehicle guidance system will be described. Thereafter, as an embodiment, a vehicle guidance system that is an extension of the vehicle guidance system will be described. Specifically, the description will be given based on the following Sections.

1. A fundamental AGV guidance operation using a vehicle guidance system (FIGS. 1 through 16)
2. An AGV guidance operation using a vehicle guidance system according to the present embodiment (FIGS. 17 through 26)

For convenience of understanding, it is assumed in the description of Section 1 that an AGV is a transport robot which transports automobiles in a car park. In the description of Section 2, it is assumed that an AGV is a transport robot which is not limited to the purpose of automobile transportation.

Hereinafter, with reference to the attached drawings, an exemplary construction for a vehicle guidance system, a vehicle, a guidance device, and a computer program will be described. Note however that unnecessarily detailed descriptions may be omitted. For example, detailed descriptions on what is well known in the art or redundant descriptions on what is substantially the same constitution may be omitted. This is to avoid lengthy description, and facilitate the understanding of those skilled in the art. The accompanying drawings and the following description, which are provided by the inventors so that those skilled in the art can sufficiently understand the present disclosure, are not intended to limit the scope of claims. In the present specification, identical or similar constituent elements are denoted by identical reference numerals.

1. A Fundamental AGV Guidance Operation Using a Vehicle Guidance System (FIGS. 1 through 16)

An AGV that is utilized in a car park carries a car of a user of the car park, and moves to a vacant parking slot in accordance with a guidance command which is received from an external guidance device 20. Once arriving at the target parking slot, the AGV unloads the car onto that parking slot. Thereafter, the car is kept in that slot. When the user of the car park returns, in accordance with a guidance command which is received from the guidance device, the AGV moves to the slot where the user's car is parked, and loads the car onto itself. Thereafter, based on a guidance command from the guidance device, the AGV moves to a checkout point as its destination.

First, with reference to FIG. 1, an operation of a vehicle guidance system will be described in outline.

FIG. 1 shows an operation of a vehicle guidance system 1 in outline. Hereinafter, for simplicity of description, the vehicle guidance system 1 will be referred to as the "guidance system 1".

The guidance system 1 includes an AGV 10, a guidance device 20, and a positioning device 30. The AGV 10 may or may not be transporting a car.

Let k be a positive integer. Suppose that the AGV 10 is at the leftmost location Pk in FIG. 1. Suppose that, by utilizing the map information retained in itself, the guidance device 20 is trying to guide the AGV 10 from a location Pk, through a location P(k+1), to a location P(k+2). In FIG. 1, the expected path of guidance by the guidance device 20 is indicated by broken lines. The AGV 10 and the guidance device 20 in the guidance system 1 operate in the following manners.

(1) In accordance with a guidance command k from the guidance device 20, the AGV 10 begins to travel from the location Pk ("A1" in FIG. 1). The guidance command k is a command indicating information which is necessary for arriving at the location P(k+1) from the location Pk. In the present specification, a guidance command is a command indicating a moving direction (angle) and a moving amount (distance). The moving direction (angle) is an angle with respect to a current traveling direction of the AGV 10. The AGV 10 needs to travel only by a designated distance in a designated moving direction. The AGV 10 does not even need to know its current location.

(2) Once beginning travel in accordance with the guidance command k ("A1" in FIG. 1), the AGV 10 continues to travel until the operation in accordance with the guidance command k is completed ("A2" in FIG. 1). One guidance command defines one section to be traveled. Without being limited to a straight line, a "section" may also involve a curve. The AGV 10 may have an inertial measurement unit (e.g., a gyroscope or a rate sensor) installed thereon, and, during travel of each section, correct traveling errors by using an output signal from the inertial measurement unit. Although it is not essential in the present disclosure to correct traveling errors by using sensors or the like which are included in the AGV 10, it may be performed for an enhanced accuracy of tracking the traveling path for the AGV 10.

(3) The positioning device 30 is able to determine the location of AGV 10 by using, for example, identification information (RFID) which is transmitted in the form of an electromagnetic wave from an IC tag that the AGV 10 possesses ("B1" in FIG. 1). Without being limited to this example, the method by which the positioning device 30, being external to the AGV 10, determines the location of the AGV 10 may be implemented via measurement or estimation through various approaches, as will be described later.

(4) Because of non-uniform wear of the tires attached to the wheels, etc., the AGV 10 may travel a path (solid line) that is deviated from a presumed path (broken line). However, the AGV 10 does not need to determine whether it has deviated from the presumed path (broken line) or not. During travel of the AGV 10, the guidance device 20 estimates (predicts) an expected location of arrival PE(K+1), from the current location, traveling velocity, moving direction, and the like of the AGV 10 ("B2" in FIG. 1).

Note that the aforementioned deviation of the traveling path may occur even if traveling errors are corrected by using an output signal from a gyroscope. The reason is an accumulation of errors associated with the precision of detection of the gyroscope. For example, if the gyroscope has an angular precision of ±1.15 degrees, a 50 cm deviation from the initial expected location of arrival may result as the AGV 10 advances 25 m, and a 1 m deviation may result as the AGV 10 advances 50 m.

(5) The guidance device 20 generates a guidance command (k+1) from the expected location of arrival PE(K+1) to the destination P(k+2) in the next section ("B3" in FIG. 1). Then, the guidance device 20 transmits the guidance command (k+1) once or a plurality of times to the AGV 10, before travel of the current section is completed ("B4" in FIG. 1).

(6) After arriving at the expected location of arrival PE(K+1), the AGV 10 travels in accordance with the guidance command (k+1) ("A4" in FIG. 1).

Transmitting the guidance command (k+1) a plurality of times in (5) above makes it possible that, depending on the radio condition, even if the guidance command (k+1) temporarily fails to be received by the AGV 10, the guidance command (k+1) may be received by the AGV 10. Before the AGV 10 arrives at the expected location of arrival PE(K+1), in order to allow the AGV 10 to receive the guidance command (k+1), the guidance device 20 may increase how often the guidance command (k+1) is transmitted. For example, the guidance device 20 may increase how often the guidance command (k+1) is transmitted when the distance between the AGV 10 and the expected location of arrival PE(K+1) or the remaining distance to be traveled by the AGV 10 becomes equal to or smaller than a predetermined value.

As the AGV 10, the guidance device 20, and the positioning device 30 in the guidance system 1 operate in the manner described above, the guidance device 20 is able to guide the AGV 10 from the expected location of arrival PE(K+1) to the location P(k+2). In this case, too, the AGV 10 may possibly arrive at a location which is deviated from the location P(k+2). Therefore, the guidance device 20 may determine an expected location of arrival PE(K+2) in the section (k+1), and generate a guidance command from the expected location of arrival PE(K+2) further to a destination P(k+3) in a next section.

For each section, a guidance command is generated, or corrected, so as to guide back to the originally-intended destination, whereby any deviation in the location of the AGV 10 is reset for each section. In other words, deviations in the location of the AGV 10 will not accumulate. Through this, the deviation in the location at the point of final arrival can be greatly reduced. Furthermore, the AGV 10 does not need to retain map information for determining a path, and conduct autonomous travel by itself while utilizing various sensor information, etc., and thus there is no need to adopt high-performance microcontrollers, large-capacity semiconductor memories, or the like. As a result, the hardware cost for the AGV 10 can be decreased. If the map information is altered due to layout changes, expansion, etc., in the car park to be traveled, only the map information that is retained in the guidance device 20 may be updated. Thus, the maintenance cost for the guidance system 1 can also be decreased.

The guidance-command based method of traveling is quite distinct from a method of traveling in which the AGV 10 would be instructed to move to a certain point, and instructed to further move to another point from that point. In the latter method, not only that the AGV 10 needs to travel while retaining path information, but the AGV 10 also needs to autonomously determine whether it has arrived at a location as instructed. Therefore, the AGV 10 needs a memory for retaining path information, a system (e.g., the GPS) for measuring its own location, sophisticated arithmetic circuits for determining whether the current location is a designated location and controlling travel, and the like.

Figure 2:
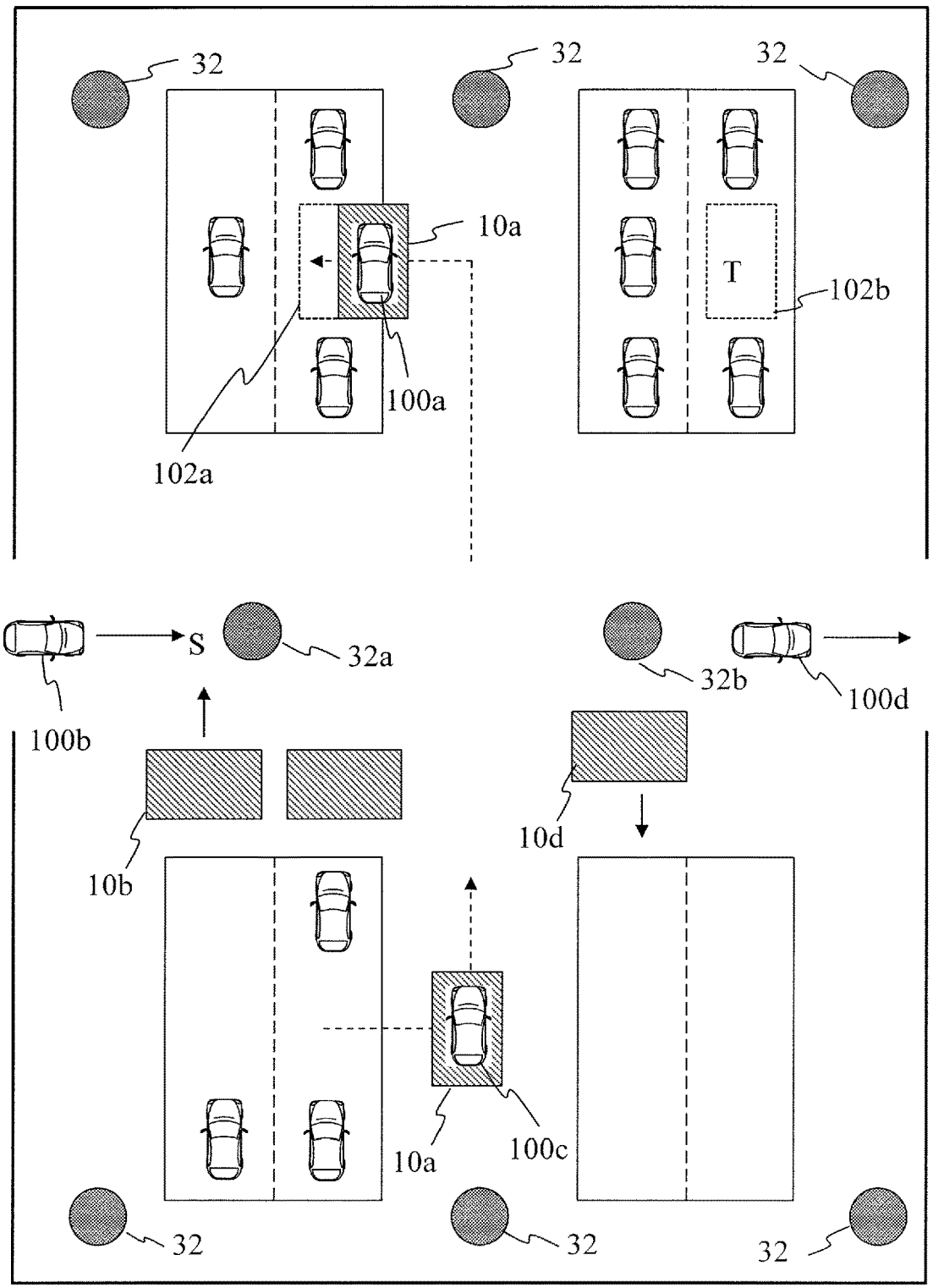
FIG. 2 is a bird's eye view of a car park to which the guidance system 1 has been introduced.

FIG. 2 is a bird's eye view of a car park to which the guidance system 1 has been introduced. The illustrated guidance system 1 includes a plurality of AGVs 10 and a plurality of relay devices 32. For example, the relay devices 32 wirelessly receive identification information of the AGVs 10 that is transmitted from the AGVs 10, and transmit it to the guidance device 20 and the positioning device 30 not shown. Moreover, the relay devices 32 wiredly receive guidance commands for the AGVs 10, which are output from the positioning device 30, and wirelessly transmit them to the AGVs 10.

An AGV 10 loads an automobile that has entered into the car park, transports it to a vacant parking slot, and unloads it onto that parking slot. Moreover, an AGV 10 loads a parked car, and transports it to a checkout point. Moves of the AGV 10 are made based on guidance commands which are transmitted from the guidance device 20.

FIG. 2 illustrates various AGVs 10 during travel. For example, an AGV 10*a*, which loaded a car 100*a*, has just arrived at a vacant slot 102*a*. An AGV 10*b* is moving toward a location S at which to load a car 100*b*. After loading the car 100*b*, the AGV 10*b* will transport the car 100*b* to a vacant slot 102*b*, in accordance with guidance commands from the guidance device 20. An AGV 10*c* is bringing out from a parking slot a car 100*c* which has been parked there. An AGV 10*d* has unloaded at the checkout point a car 100*d* which it loaded, and now has receded.

Figure 3:
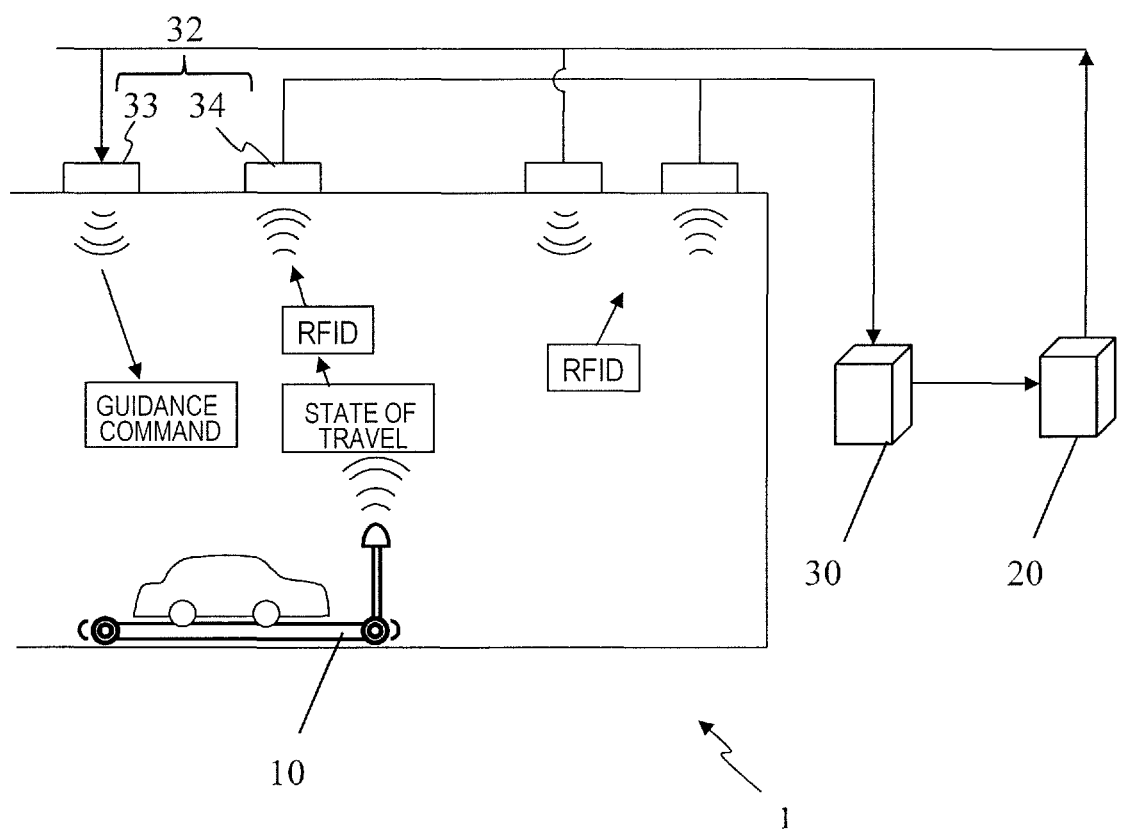
FIG. 3 is a schematic diagram showing the content of information that is exchanged between an AGV 10 and a guidance device 20 or a positioning device 30.

FIG. 3 is a schematic diagram showing the content of information that is exchanged between an AGV 10 and the guidance device 20 or the positioning device 30. As described above, the guidance device 20 works so that guidance commands are transmitted from transmission antennas 33 of the relay devices 32 toward each AGV 10. On the other hand, an AGV 10 transmits identification information (RFID) which uniquely identifies itself, and information indicating its current state of travel. The information which is transmitted from an AGV 10 is received by reception antennas 34 of the relay devices 32. The identification information is retained in an RF tag that is possessed by the AGV 10. Information representing the state of travel may be, for example, a traveling distance and a traveling direction (moving forward or moving in reverse) of the AGV 10.

Reception of identification information which is transmitted from an AGV 10 will be described. The identification information is carried by using a radio wave. The radio wave is received by the reception antennas 34 of the plurality of relay devices 32. The positioning device 30 is able to measure the location of the AGV 10 by utilizing the angle of arrival of a radio wave through which the identification information is received by each reception antenna 34. Examples of specific processes by the positioning device will be described later.

How often (e.g., frequency) information transmission/reception is performed will be described. An AGV 10 transmits identification information and information of its state of travel periodically, e.g., every 0.1 seconds. On the other hand, the frequency with which the guidance device 20 transmits guidance commands may vary. For example, the guidance device 20 may, before start of travel of the AGV 10, transmit respective guidance commands for the plurality of sections altogether. Thereafter, while the AGV 10 is moving in the current section, a guidance command for the next section is corrected and transmitted. In doing so, the guidance command for the next section is transmitted a plurality of times, at a constant interval, or while changing the frequency of transmitting as described above.

Figure 4:
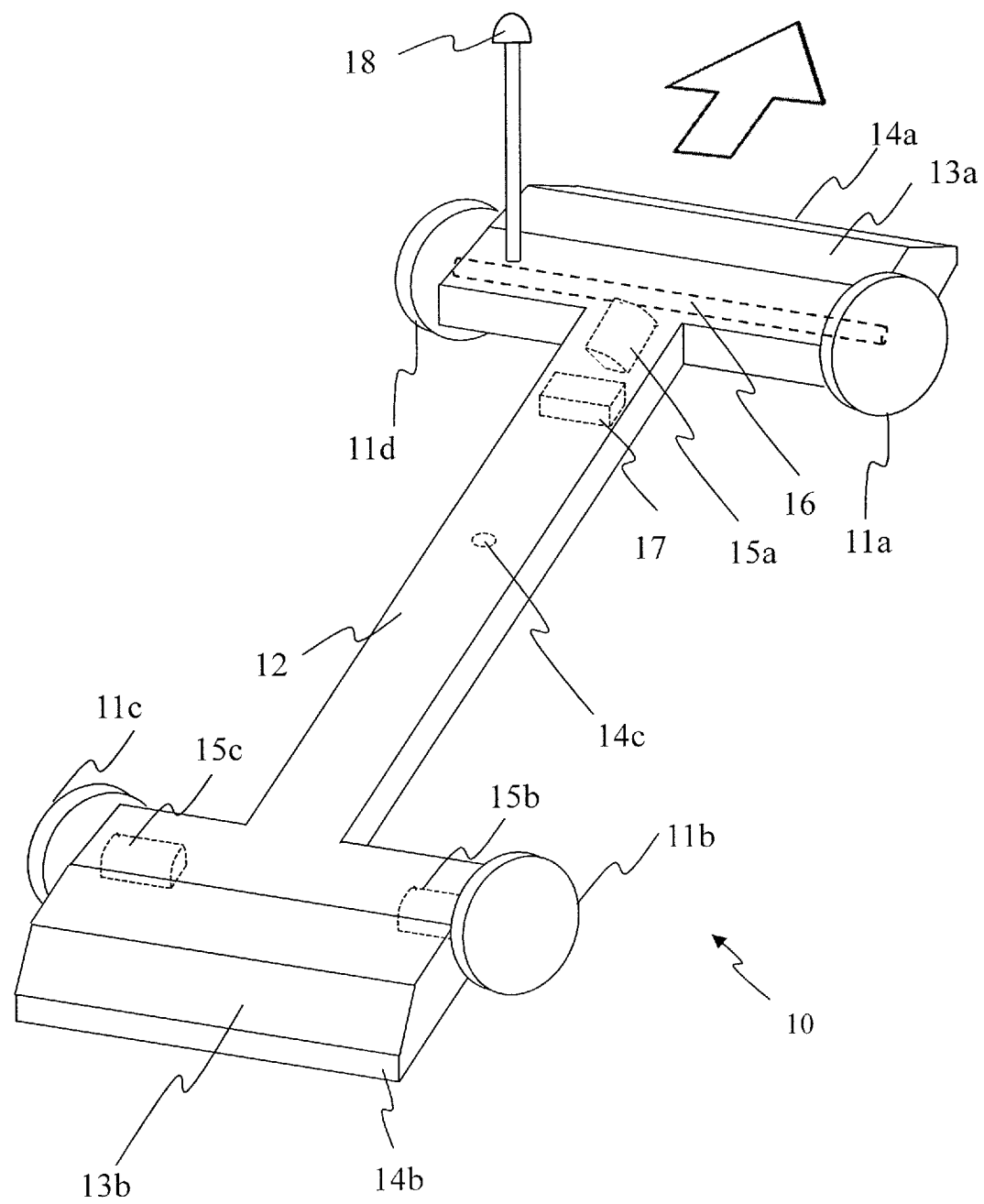
FIG. 4 is an outer view of the AGV 10.
Figure 5:
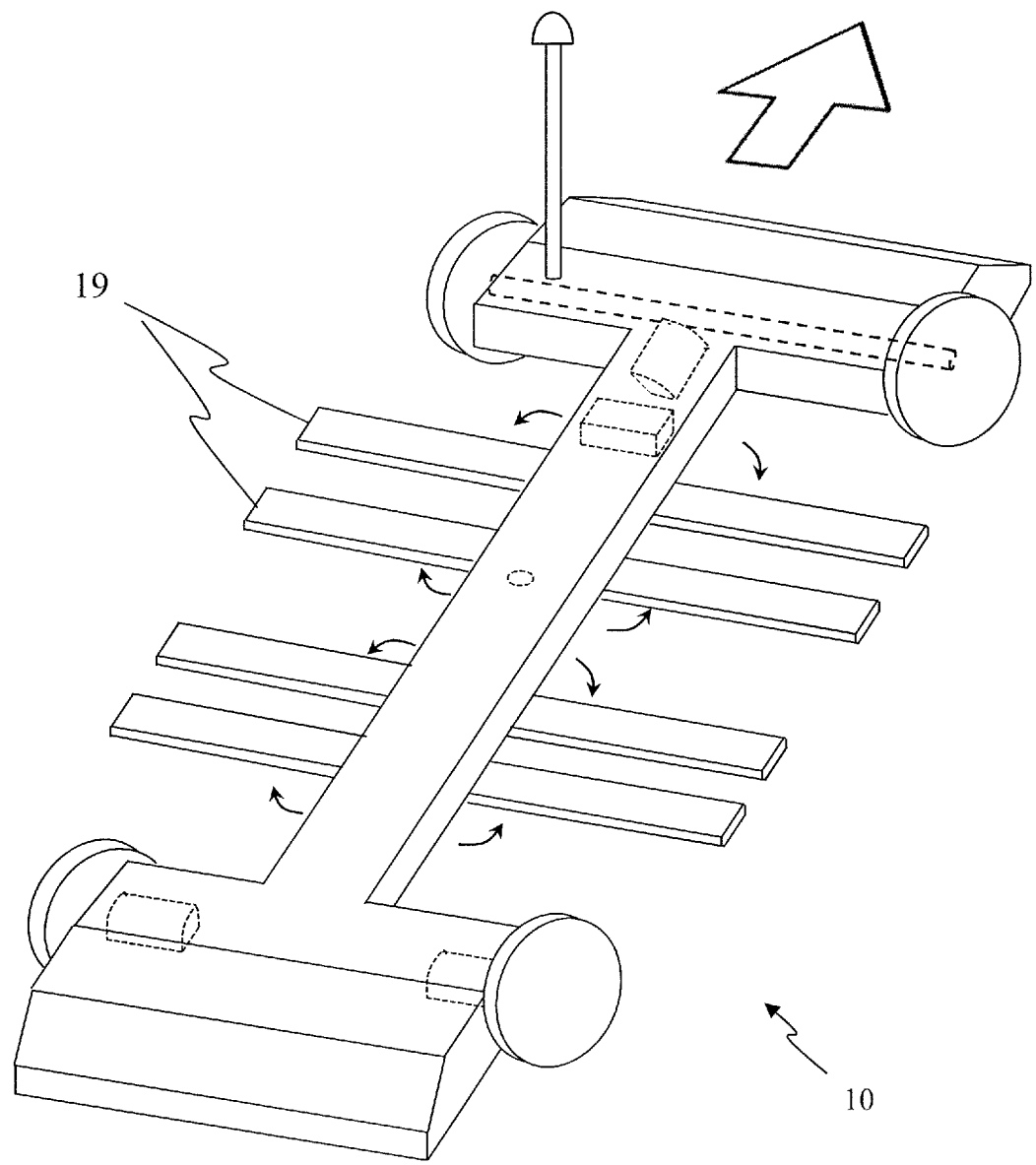
FIG. 5 is an outer view of the AGV 10 with unfolded liftbars 19.

FIG. 4 and FIG. 5 are outer views of an AGV 10. In FIG. 5, liftbars 19 to be used for transporting a car are unfolded.

The AGV 10 shown in FIG. 4 and FIG. 5 is presented in an outer view as looking from the rear toward the front, where the direction of an arrow indicates the forward direction.

The AGV 10 includes front wheels 11a and 11d, rear wheels 11b and 11c, a frame 12, front and rear bumpers 13a and 13b, and an IC tag 18. The diameter of the front/rear wheels 11a through 11d of the AGV 10 may be e.g. about 80 mm. This diameter may be determined based on a ground clearance of the car to be transported. By setting the diameter of the front/rear wheels so as to be smaller than this ground clearance, the AGV 10 is allowed to go under the car to be transported. The IC tag 18 is installed at the top of a pole, so that communications can be stably performed even while transporting a car. Details of the tag will be described later.

Furthermore, within the frame 12, the AGV 10 includes a motor 15a for steering purposes, motors 15b and 15c for driving the rear wheels, and a rack shaft 16. At both ends of the rack shaft 16, the front wheels 11a and 11d are attached via a steering mechanism not shown. As the steering mechanism for adjusting the moving direction, the AGV 10 in this example includes a rack-and-pinion type steering mechanism. A pinion gear is attached to the rotation shaft of the motor 15a for steering. A rack gear is attached to the rack shaft 16. If the motor 15a makes a forward rotation, for example, the pinion gear pushes out the rack gear toward right as facing in the moving direction, and the steering mechanism causes the front wheels 11a and 11d to face right. As a result of this, the AGV 10 is made to turn right. Similarly, when the motor 15a makes a reverse rotation, the AGV 10 is made to turn left.

The motors 15b and 15c are power sources which respectively rotate the rear wheels 11b and 11c to generate a propulsion power (driving power) for propelling the AGV 10. In the present specification, the rear wheels 11b and 11c may be referred to as drive wheels.

Note that, in order to operate the motors 15a through 15c and the like, the AGV 10 utilizes electric power that is stored in a battery. The battery is omitted from illustration in FIG. 4.

The AGV 10 includes bumper switches 14a and 14b, respectively, in the front and rear bumpers 13a and 13b. The bumper switches 14a and 14b are turned ON when an object contacts a bumper. Based on outputs of the bumper switches 14a and 14b, contact or collision of the AGV 10 with another object can be detected.

The AGV 10 includes a gyroscope 14c within the frame 12. In the present specification, the gyroscope 14c is a rate sensor which detects an angular velocity (yaw angular velocity) in the direction that the AGV 10 turns (rotates). By integrating the angular velocity values which are output from the gyroscope 14c, an angle by which the AGV 10 has turned is derived.

The travel control unit 17 controls the operation of the AGV 10. Specifically, the travel control unit 17 changes the angles of the front wheels 11a and 11d by controlling the angle of rotation of the motor 15a, so that they will be oriented in a moving direction as instructed by a guidance command that is received from the guidance device 20. For example, the travel control unit 17 may retain information of angular variation A of the moving direction of the motor 15a per revolution, and calculate a number of revolutions for the motor 15a by dividing an angle as instructed by a guidance command with A. The travel control unit 17 outputs a control signal (PWM signal) for causing the motor 15a to rotate by the calculated number of revolutions.

As described above, the moving direction (angle) is defined as an angle with respect to a current traveling direction of the AGV 10. For example, when the angle θ has a positive value, it may indicate an angle for advancing left with respect to the traveling direction; when the angle θ has a negative value, it may indicate an angle for advancing right with respect to the traveling direction. The travel control unit 17 determines the direction of rotation of the motor 15a in accordance with the angle θ being positive or negative.

Moreover, the travel control unit 17 determines a number of revolutions for the motors 15b and 15c so that a distance as instructed by a guidance command will be traveled, and causes the motors 15b and 15c to each independently rotate by this number of revolutions. For example, the travel control unit 17 may retain information of traveling distance L per revolution of the tires of the rear wheels 11b and 11c, and calculate a number of revolutions for the rear wheels 11b and 11c by dividing a distance as instructed by a guidance command with L. The travel control unit 17 outputs a control signal (PWM signal) which causes the motors 15b and 15c to rotate by the calculated number of revolutions.

The AGV 10 shown in FIG. 4 is illustrated so that angles of the front wheels 11a and 11d controlled by using the motor 15a, for a moving direction adjustment. However, this construction is an example. The moving direction may be changed by controlling the motors 15b and 15c to change the rotational speeds of the right and left rear wheels 11b and 11c, which are drive wheels. In this case, the motor 15a and the rack shaft 16 are not needed.

Next, with reference to FIG. 5, a structure for the AGV 10 to transport a car, and an operation thereof will be briefly described.

FIG. 5 shows eight liftbars 19 of the AGV 10. The AGV 10 has four sets of liftbars, where each set consists of two liftbars 19. When not transporting a car, the liftbars 19 are accommodated under the frame 12 (FIG. 4). When transporting one, the AGV 10 approaches by moving in reverse from the front or the rear of a car, and goes under the car. The positions of the tires of the car may be determined e.g. from an image using a camera not shown, and it stops at that position. Thereafter, the liftbars 19 are unfolded from under the frame 12, and pinch one tire of the car with the two liftbars 19 in one set, and gradually decrease their distance until the tire is lifted. Once all of the four tires become lifted, the AGV 10 is able to transport the car.

Figure 6:
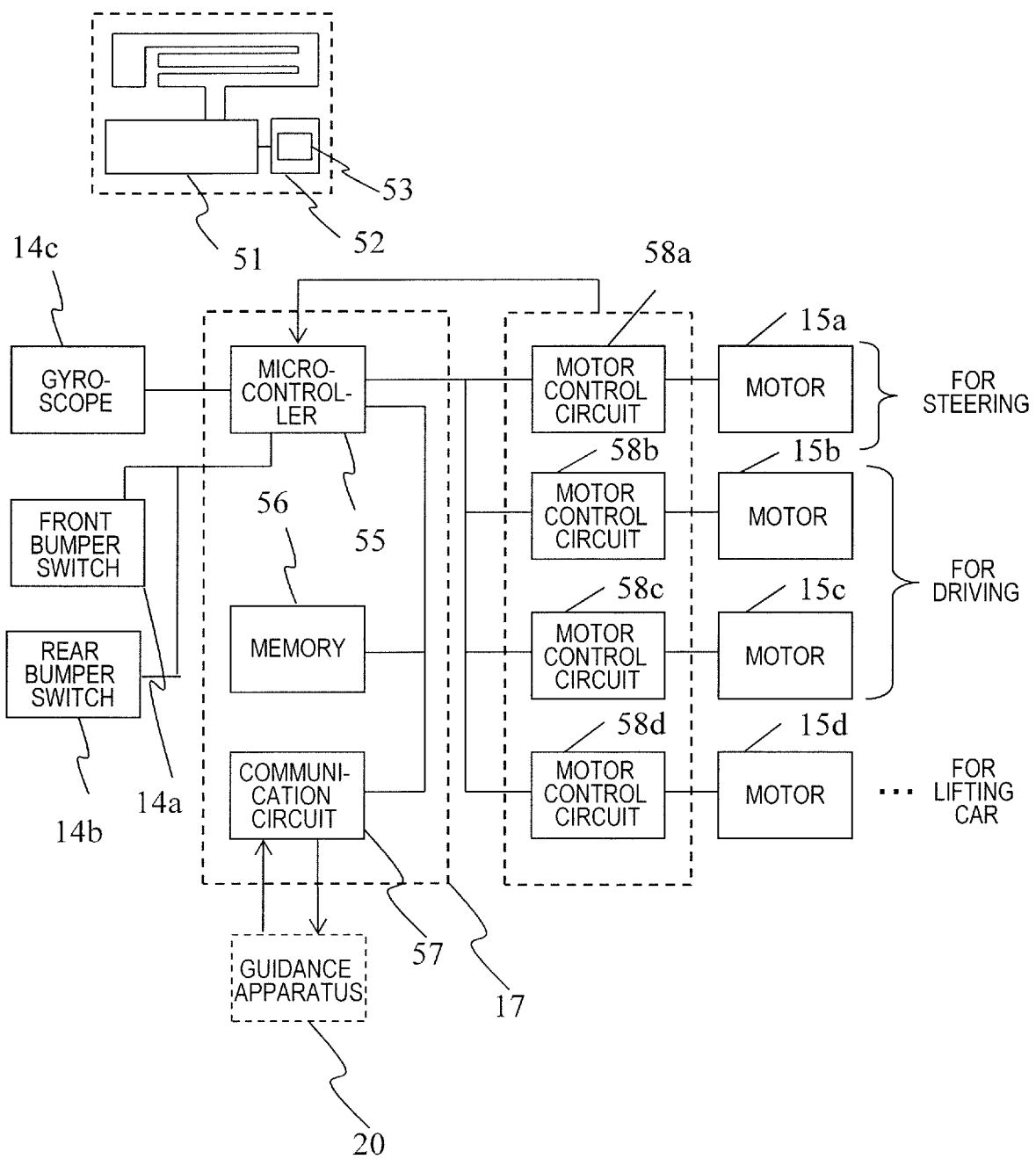
FIG. 6 is a construction diagram of the hardware of the AGV 10.

FIG. 6 shows a hardware construction of the AGV 10. Description of any component element that was described in connection with FIG. 4 and FIG. 5 will be omitted.

The AGV 10 includes a motor 15d. The motor 15d is used to accommodate or unfold the liftbars 19 shown in FIG. 5, and to alter the interval between one set of liftbars 19. While FIG. 6 illustrates only one motor 15d, in actuality, a motor may be provided for each set of liftbars 19, for example.

The AGV 10 includes motor control circuits 58a through 58d. The motor control circuits 58a through 58d are inverter circuits, which may also be referred to as controllers. Based on control signals (PWM signals) which are output from a microcontroller 55 of the travel control unit 17 as will be described later, the motor control circuits 58a through 58d respectively control the currents flowing in the motors 15a through 15d and their voltages, in order to change the rotational speeds of the motors.

The travel control unit 17 of the AGV 10 includes a microcontroller 55, a memory 56, and a communication circuit 57. The microcontroller 55, which is a microcomputer or a computer, controls the operation of the AGV 10. The memory 56, on which a computer program to be executed by the microcontroller 55 is laid out, temporarily stores guidance commands which are received from the guidance device 20. Note that the memory 56 is a block including a so-called DRAM and a flash memory. The flash memory stores a computer program to be executed by the microcontroller 55, for example.

An exemplary process by the microcontroller 55 will be described.

For example, based on a moving direction that is contained in a guidance command which is transmitted from the positioning device 30, the microcontroller 55 outputs to the motor control circuit 58a a control signal which causes the motor 15a for steering purposes to rotate by an angle corresponding to that moving direction. Moreover, based on the traveling distance contained in the guidance command, the microcontroller 55 outputs to the motor control circuits 58b and 58c a control signal which causes the motors 15b and 15c to rotate by a number of turns corresponding to that traveling distance. Moreover, the microcontroller 55 outputs to the motor control circuit 58d control signals which cause the liftbars 19 to be unfolded or accommodated, and cause the motor 15d to rotate by a number of turns necessary for altering their interval.

Furthermore, the microcontroller 55 receives analog output signals from the gyroscope 14c, subjects them to AD conversions internally, integrates the angular velocity signals, and performs Kalman filter processing as necessary, and then calculates an angle by which the AGV 10 has turned.

Moreover, upon detecting that output signals from the front and rear bumper switches 14a and 14b have gone up to the high level, indicative of a "contact", the microcontroller 55 performs an emergency stop process. Specifically, the microcontroller 55 transmits control signals to all or some of the motor control circuits 58a through 58d to stop rotation of the motors 15a through 15d.

FIG. 6 further shows the construction of the IC tag 18. The IC tag 18 includes an IC 51 to generate a radio frequency signal, a storage device 52, and an antenna 54. The storage device 52, which is e.g. a flash ROM, stores unique identification information 53 for each AGV 10. The IC 51 periodically transmits identification information by using the antenna 54. Note that the IC tag 18 is not connected to the microcontroller 55 or the like. The reason is that the IC 51 of the IC tag 18 only needs to periodically transmit identification information. However, it may be connected to the microcontroller 55, and transmit identification information in accordance with instructions from the microcontroller 55. Note that the aforementioned processes may all be implemented with a single chip, based on a multi-core IC.

In the present embodiment, the IC tag 18 emits signal waves according to the Bluetooth (registered trademark) Low Energy (BLE) standards. More specifically, the IC tag 18 uses three channels, and keeps transmitting a signal wave containing an advertisement packet for each channel on a regular basis. The signal wave frequency may be e.g. in the microwave band, but may also be in the millimeter wave band. From the IC tag 18, signal waves of the 2.4 gigahertz band may be emitted with a time interval of e.g. not less than 10 milliseconds and not more than 200 milliseconds, and typically with a time interval of 100 milliseconds. So long as they are capable of being received by the array antenna 20, the signal waves do not need to have a constant frequency, but may hop between a plurality of frequencies.

In an advertisement packet, a "public device address" or a "random device address" serving as identification information (RFID) which uniquely identifies the IC tag 18 is described. With this, one's own presence can be known to the surroundings.

In the present embodiment, the IC tag 18 may operate as a so-called "non-connectable beacon" which only broadcasts an advertising packet and does not accept requests for connection from the positioning device 30 or the like. However, the IC tag 18 may be a "connectable beacon" which can accept a request for connection from the positioning device 30 or the like and perform data transmission/reception.

Note that the IC tag 18 may be a device that operates in accordance with any other standards.

Next, with reference to FIG. 7 and FIG. 8, the guidance device 20 and the positioning device 30 will be described.

Figure 7:
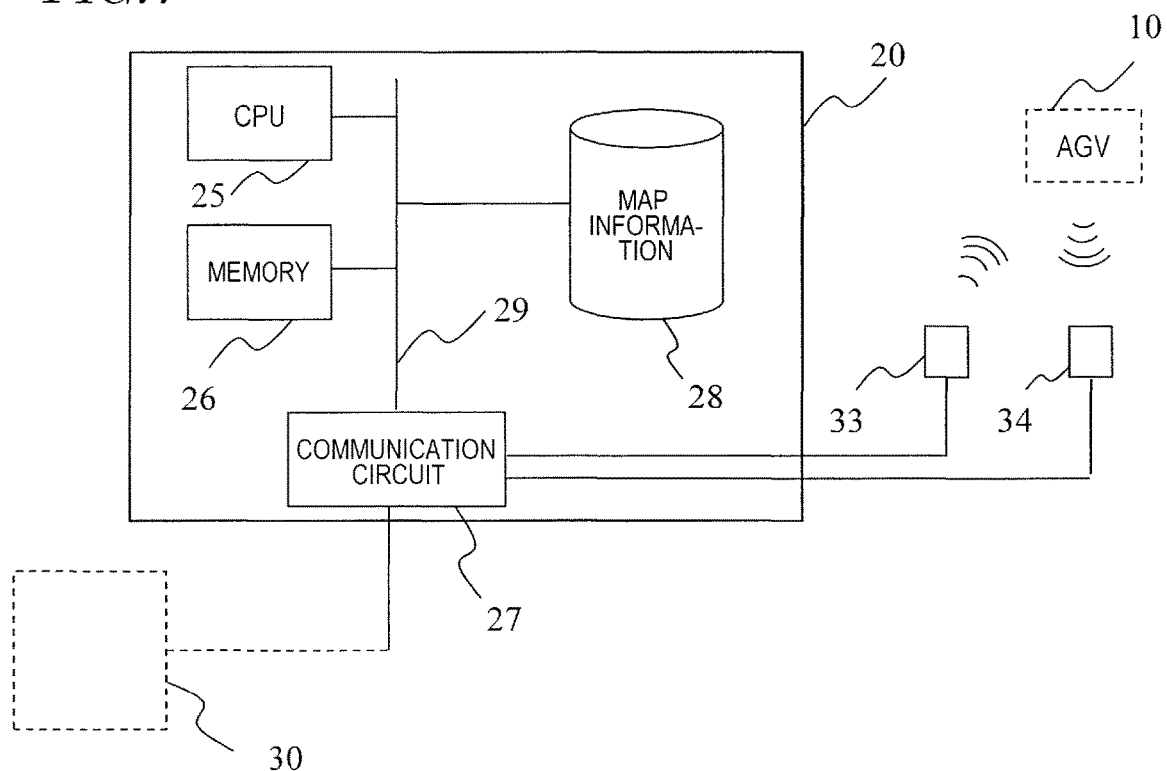
FIG. 7 is a construction diagram of the hardware of the guidance device 20.

FIG. 7 shows the hardware construction of the guidance device 20.

The guidance device 20 includes a central processing unit (CPU) 25, a memory 26, a communication circuit 27, and a map information database (DB) 28, which are connected via an internal bus 29.

The CPU 25 is a signal processing circuit which generates guidance commands for guiding each individual AGV 10 through the below-described process. Typically, the CPU 25 is a computer composed of a semiconductor integrated circuit. The memory 26, which may be e.g. a DRAM, is a work memory to be used in connection with processing by the CPU 25. For example, the memory 26 stores information indicating the status of the current car park, e.g., whether each parking slot is vacant or in use, location information of each AGV 10, or other information. All of these is updated by the CPU 25 from time to time.

The communication circuit 27 is, for example, a communication circuit which includes one or more communication connectors to perform wired communications under the Ethernet (registered trademark) standards. From the positioning device 30, the communication circuit 27 acquires location information indicating the location of each AGV 10. Moreover, from the AGV 10, the communication circuit 27 receives information of its state of travel via the reception antennas 34 of the relay devices 32. At this time, communications may be relayed by the positioning device 30. Moreover, the communication circuit 27 transmits a guidance command to each AGV 10, via the transmission antennas 33 of the relay devices 32.

The map information DB 28 retains information such as: the layout within the car park to which the guidance system 1 is introduced; the region in which the AGV 10 is able to travel; the shortest path from the check-in location for cars to each parking slot; and detour paths.

The process by which the CPU 25 generates guidance commands will be described later in detail.

Figure 8:
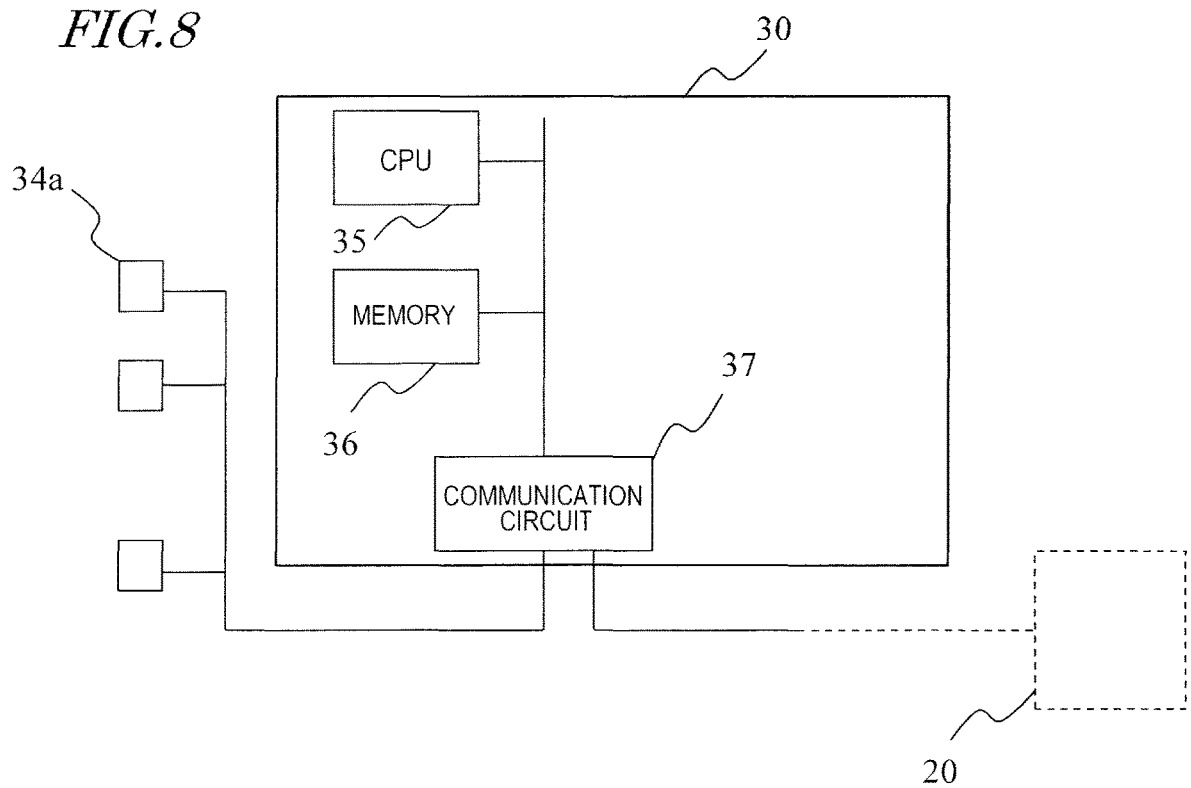
FIG. 8 is a construction diagram of the hardware of the positioning device 30.

FIG. 8 shows the hardware construction of the positioning device 30.

The positioning device 30 includes a CPU 35, a memory 36, and a communication circuit 37, which are connected via an internal bus. Through the below-described process, the CPU 35 measures the location of each AGV 10, and generates location information indicating the measured location. The memory 26, which may be e.g. a DRAM, is a work memory to be used in connection with processing by the CPU 35. The communication circuit 37 is, for example, a communication circuit which includes one or more communication connectors. The communication circuit 37 is connected to the reception antennas 34 of the relay devices 32 via wires. More specifically, the communication circuit 37 is connected to the output of an antenna element 34*a* that is provided in each reception antenna 34, and receives a radio frequency electrical signal which is generated from an electromagnetic wave that is received by the antenna element 34*a*. Moreover, the communication circuit 37 is connected to the communication circuit 27 of the guidance device 20 via, for example, wired communication lines through which wired communications under the Ethernet (registered trademark) standards are to be performed.

Hereinafter, the process of measuring the location of an AGV 10 (positioning process), which is performed by the positioning device 30, will be described. Various positioning processes for objects on a plane or in a space are known. The positioning device 30 utilizes one of such positioning processes, or a combination of positioning processes, to measure the location of an AGV 10. Hereinafter, the positioning process will be illustrated by example.

(a) The positioning device 30 measures the direction from which a radio signal that was transmitted from the IC tag 18 of an AGV 10 has arrived, and determines the location of the vehicle (AOA (Angle Of Arrival) method). The AOA method is a method in which, when a signal transmitted from the IC tag 18 is received by a plurality of reception antennas 34, the angle of arrival of an arriving radio wave is measured based on a reference orientation (e.g., the frontal direction of each reception antenna) to determine the location of the AGV 10. Since the smallest number of base stations that are required for determining locations (i.e., the number of relay devices 32 including the reception antennas 34) is two, only a few relay devices 32 are concurrently needed. Since accurate angle measurements are possible, the location of the AGV 10 can be determined with a high precision when no obstacle exists between the base station and the terminal and there is a clear line of sight.

As each reception antenna 34, an array antenna in which a plurality of antenna elements are arranged in a one-dimensional or two-dimensional array can be utilized. Alternatively, a phased array antenna may be used, which controls the beam direction and emission pattern by adjusting the phase of a current to flow in each antenna element. In the case where an array antenna is used, a single reception antenna 34 may be used in identifying the direction of the IC tag 18 relative to that reception antenna 34. In this case, it is possible to determine the location of the IC tag 18 with a single reception antenna 34. For example, in the case of identifying the direction of the IC tag 18 relative to a reception antenna 34 that is disposed on a ceiling plane at a predetermined height, if the height of the IC tag 18 relative to the floor plane is either known or estimated, then it is possible to determine the location of the IC tag 18. Therefore, positioning for the IC tag 18 is possible with a single reception antenna 34.

(b) The positioning device 30 receives a radio signal which is emitted from the IC tag 18 with a plurality of reception antennas 34 (or antenna elements 34*a*), and determines the location of the vehicle from a difference among time points of reception by the respective antenna elements 34*a* (TDOA (Time Difference Of Arrival) method). The relay devices 32 including the reception antennas 34 must function as base stations, and accurately measure time points of reception. Among the relay devices 32, accurate time synchronization needs to be made to the nanoseconds.

(c) Based on the location of the reception antenna 34 being known and the fact that a radio wave decays with distance, the positioning device 30 determines location from the reception intensity of a radio signal emitted from the IC tag 18 (RSSI (Received Signal Strength Indication) method). However, since the intensity of a received signal is under multipath influences, distance (location) calculation requires a distance decay model for each car park to which the guidance system 1 is introduced.

(d) The positioning device 30 may capture with a camera an image to which identification information of the AGV 10 is conferred (e.g., a QR code (registered trademark)), and determine the location of the AGV 10 based on the location of the camera, the direction in which the camera is oriented, and the position of the AGV 10 within the captured image.

Depending on the positioning process, the precision of positioning may vary. In positioning process (a), the precision of positioning is determined by the angular resolution of the antenna and the distance from the measured object, and that of 10 cm is attained for common buildings. In positioning process (c) , an error on the order of several meters, or 1 m even under better conditions, may occur in a common room, due to changes in radio field intensity that are caused by interferences of radio waves emitted from the IC tag, and so on. In positioning process (d), the positioning error depends on the number of pixels in the image sensor, the spatial resolution, and distortion associated with lenses. Moreover, object recognition, which process imposes a relatively high burden, is required.

From the standpoint of precision, the aforementioned positioning process (a) is currently superior. However, the guidance system 1 according to the present disclosure may be constructed by using any of positioning processes (b) through (d).

Next, with reference to FIG. 9 and FIG. 10, operations of the AGV 10, the guidance device 20, and the positioning device 30 will be described.

Figure 9:
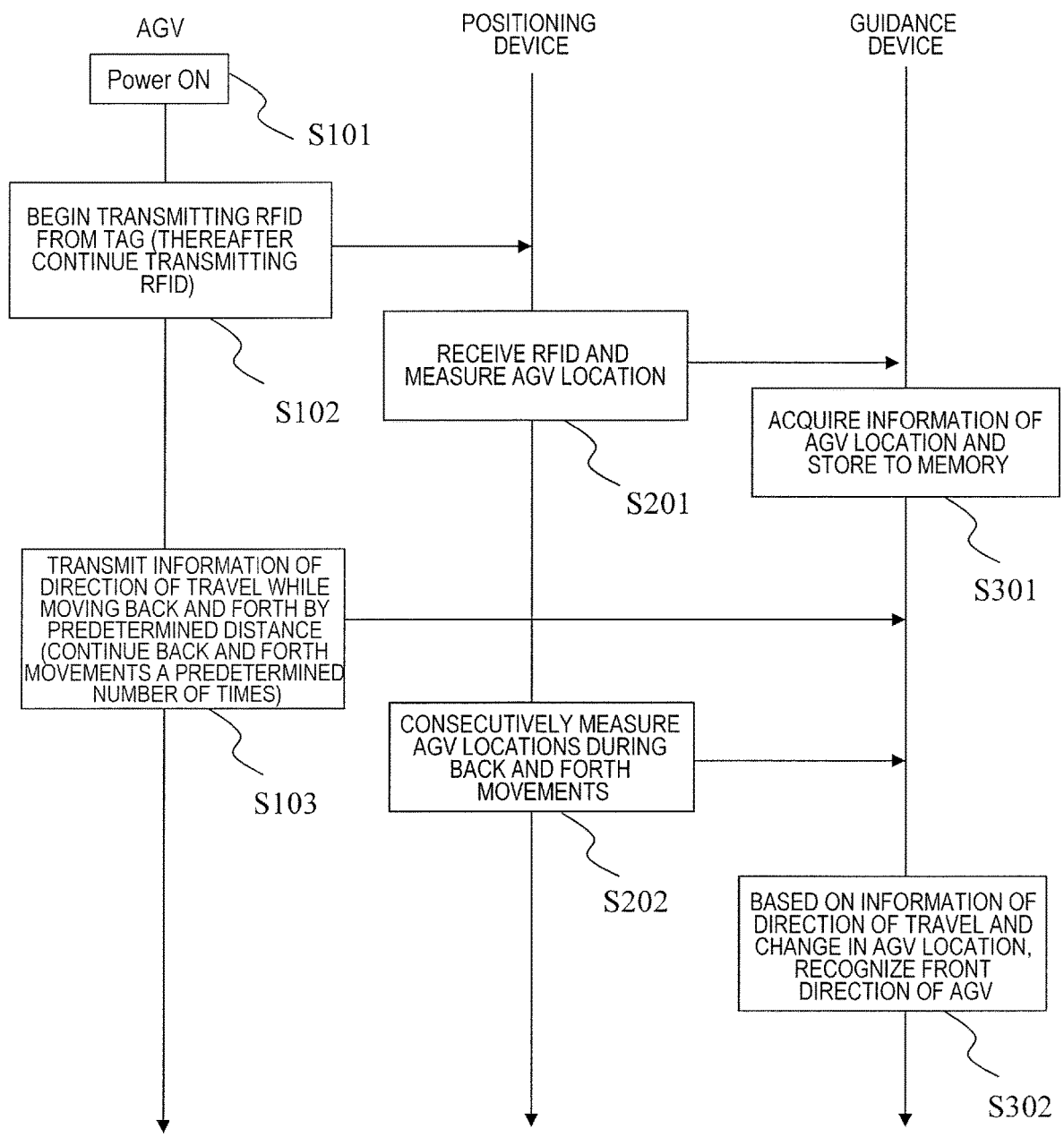
FIG. 9 is a diagram showing communications to be performed by the guidance system 1, and processes by the AGV 10, the guidance device 20, and the positioning device 30, upon activation of the AGV 10.

FIG. 9 is a diagram showing communications to be performed by the guidance system 1, and processes by the AGV 10, the guidance device 20, and the positioning device 30, upon activation of the AGV 10. The purpose of performing the processes shown in FIG. 9 is for the guidance device 20 to recognize the location of the AGV 10 and the direction in which the AGV 10 is currently oriented. As described above, in this example, a guidance command is information indicating the moving direction and traveling distance of the AGV 10, which is transmitted from the positioning device 30 to the AGV 10. As a prerequisite for the guidance device 20 to instruct the AGV 10 of moving directions, the direction in which the AGV 10 is currently oriented needs to be recognized.

In the following description, what operates is illustrated as the AGV 10, the guidance device 20, and the positioning device 30; in actuality, however, what operates is the microcontroller 55 of the AGV 10, the CPU 25 of the guidance device 20 and the CPU 35 of the positioning device 30, which transmit or receive information via their respective communication circuits. In FIG. 9 and FIG. 10, the respective processes by the AGV 10, the guidance device 20, and the positioning device 30 are denoted as "S1xx", "S2xx" and "S3xx".

At step S101, AGV 10 is powered on by the user, or by an internal timer of the AGV 10, etc. Note that step S101 may instead mean activation of the entire guidance system 1.

At step S102, the AGV 10 begins transmitting identification information (RFID) from the IC tag 18. Thereafter, the AGV 10 periodically transmits RFID.

At step S201, the positioning device 30 receives RFID from the AGV 10, and measures the location of the AGV 10 by using one or more positioning processes as described above.

At step S301, the guidance device 20 acquires information of the location of the AGV 10 as measured by the positioning device 30, and stores it to the memory 26.

Next, the AGV 10 performs step S103 for allowing the guidance device 20 to know the front of the AGV 10. The front of the AGV 10 means the direction of an arrow in FIG. 4 and FIG. 5.

At step S103, the AGV 10 moves forward and backward by a predetermined distance. As soon as moving, the AGV 10 transmits information of its state of travel, or more specifically, information indicating its direction of travel, to the guidance device 20. For example, the AGV 10 may: while moving forward, transmit information indicating that the direction of travel is "forward"; after moving by a predetermined distance, stop once; and thereafter, while moving backward, transmit information indicating that the direction of travel is "backward". The AGV 10 continues the back and forth movements a predetermined number of times, e.g., three times. Note that the distance of the forward path and the backward path in the back and forth movements to be made by the AGV 10 may be determined based on the resolution of the positioning device 30, i.e., the minimum distance that allows measurement of the location of the AGV 10.

At step S202, the positioning device 30 consecutively measures the locations of the AGV 10 during its back and forth movements, and transmit the location information to the guidance device 20.

At step S302, the guidance device 20 recognizes the front direction of the AGV 10, based on the information of the direction of travel received from the AGV 10 and changes in the location of the AGV 10.

Through the above processes, the guidance device 20 can recognize the current location of the AGV 10 and the traveling direction (forward) of the AGV 10.

Next, a process in which the guidance device 20 guides the AGV 10 will be described.

Figure 10:
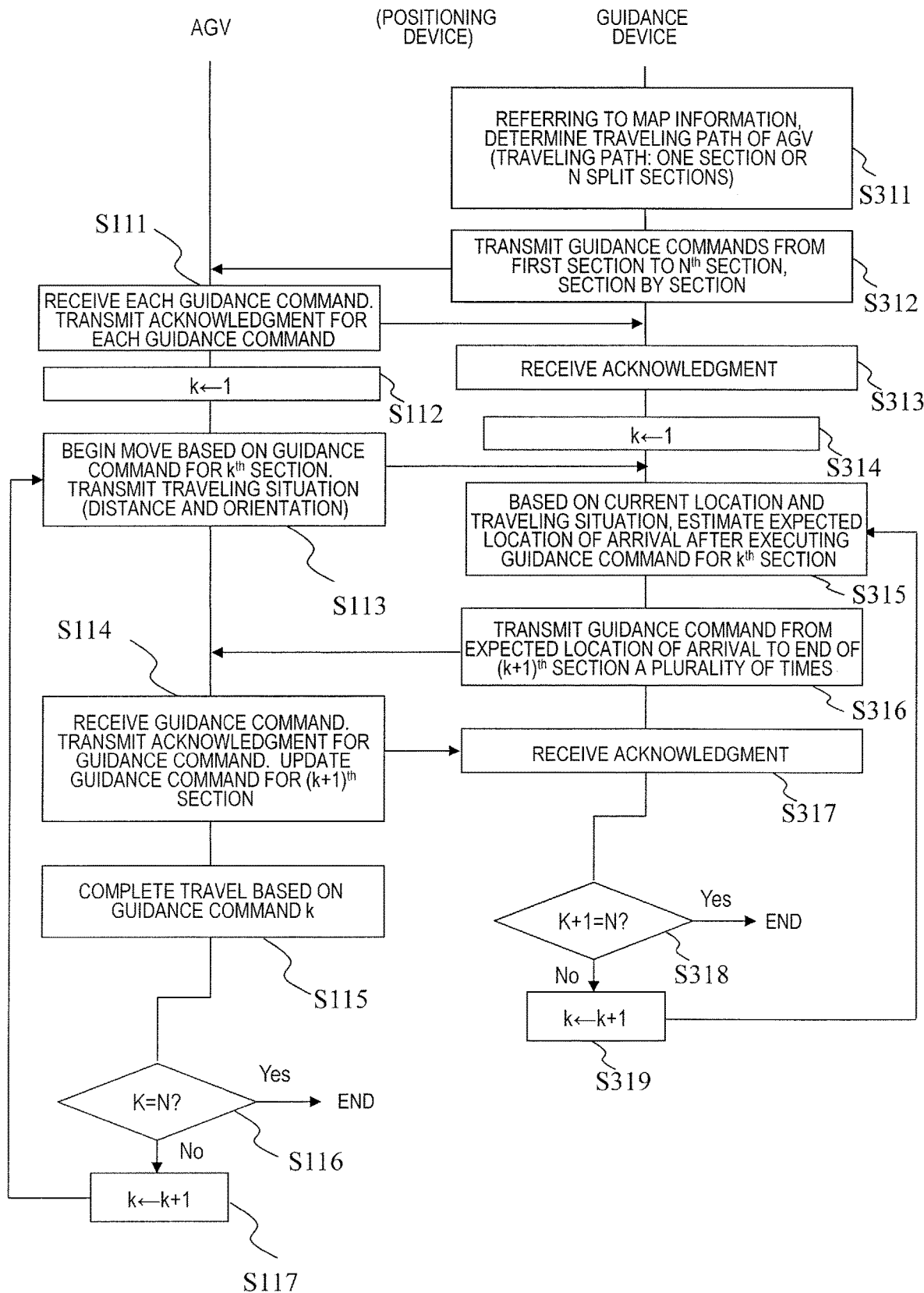
FIG. 10 is a diagram showing communications to be performed when the positioning device 30 transmits a guidance command to the AGV 10, as well as respective processes by the AGV 10 and the guidance device 20.

FIG. 10 shows communications to be performed when the positioning device 30 transmits a guidance command to the AGV 10, as well as respective processes by the AGV 10 and the guidance device 20. For ease of description, the positioning device 30 is omitted from illustration in FIG. 10. It must be noted however that the positioning device 30 is continuing the process of receiving the identification information which is transmitted from the AGV 10 and measuring the location of the AGV 10, and is consecutively transmitting this location information to the guidance device 20.

At step S311, with reference to the map information, the guidance device 20 determines a traveling path of the AGV. A "traveling path" is a path from the current location of the AGV 10 to a point of final arrival. A traveling path may be one section to be traveled with one guidance command, or N split sections (N: an integer which is 2 or greater) to be traveled with a plurality of guidance commands. In the following description, it is assumed that the traveling path includes N sections (N: an integer which is 2 or greater).

At step S312, the guidance device 20 transmits guidance commands from the first section to an $N^{th}$ section, section by section.

At step S111, the AGV 10 receives each guidance command from the guidance device 20, and transmits an acknowledgment for each guidance command to the guidance device 20. The AGV 10 stores each received guidance command to the memory 56, and substitutes 1 for a variable k. The variable k means that the guidance command which is being currently executed is a $k^{th}$ guidance command. The variable k also means that the section to be traveled is a $k^{th}$ section.

Table 1 shows an exemplary table of guidance commands that are stored in the memory 56 of the AGV 10. Note that "*" means an initial value as designated by the guidance device 20, or as presumed.

TABLE 1

| GUIDANCE COMMAND | MOVING DIRECTION (ANGLE) θ | MOVING AMOUNT (DISTANCE) L |
|---|---|---|
| 1 | $\theta_1^*$ | $L_1^*$ |
| 2 | $\theta_2^*$ | $L_2^*$ |
| . | . | . |
| . | . | . |
| p | $\theta_p^*$ | $L_p^*$ |
| . | . | . |
| . | . | . |
| N − 1 | $\theta_{N-1}^*$ | $L_{N-1}^*$ |
| N | $\theta_N^*$ | $L_N^*$ |

Figure 11A:
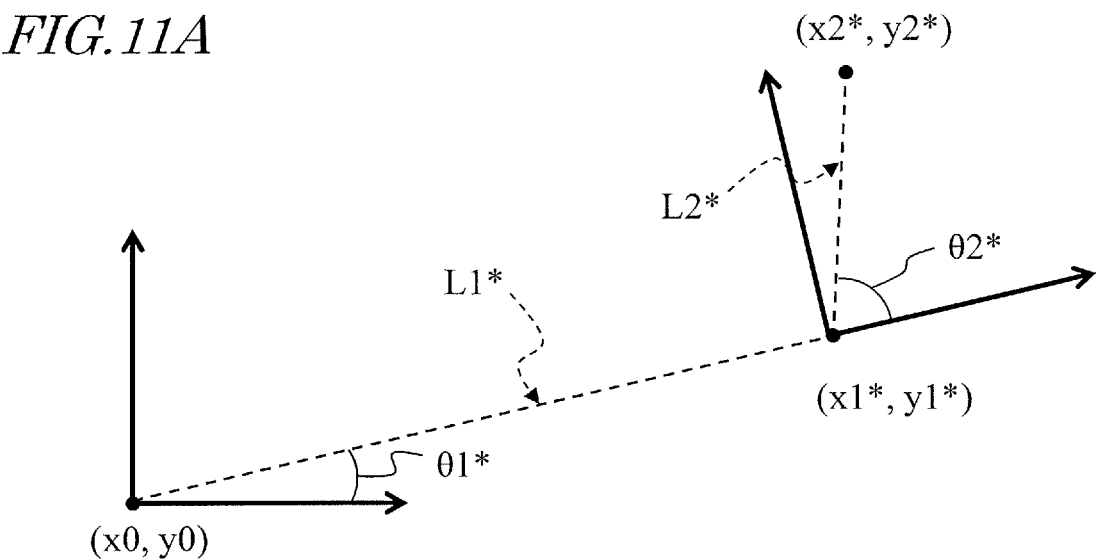
FIG. 11A is a diagram showing an exemplary operation by the AGV 10 based on guidance commands 1 and 2.

FIG. 11A shows an exemplary operation of the AGV 10 based on guidance commands 1 and 2. From a current location (x0,y0), the AGV 10 first advances at an angle $\theta_1^*$ by a distance $L_1^*$ in accordance with guidance command 1, to arrive at a location (x1*,y1*). Thereafter, from the location of arrival (x1*,y1*), the AGV 10 further moves at an angle $\theta_2^*$ by a distance $L_2^*$, to arrive at a location (x2*,y2*). Similarly thereafter, as the AGV 10 completes travel of a section p based on a guidance command p, the AGV 10 travels a section (p+1) based on a next guidance command (p+1), from that location.

FIG. 10 is referred to again.

At step S313, the guidance device 20 receives an acknowledgment of each guidance command transmitted from the AGV 10. After a guidance command is transmitted, if no acknowledgment is received from the AGV 10 within a predetermined time, the guidance device 20 may again transmit a guidance command for which no acknowledgment was received. At step S314, the guidance device 20 substitutes 1 for the variable k.

At step S113, the AGV 10 begins moving based on a guidance command for a $k^{th}$ section, and transmits the traveling situation (traveled distance and orientation) to the guidance device 20.

At step S315, based on the current location and the traveling situation, the guidance device 20 estimates an expected location of arrival after executing the guidance command for the $k^{th}$ section. The reason why the estimation process is necessary is that, as described earlier, the AGV 10 may travel a path (solid line) that is deviated from the presumed path (broken line). Then, at step S316, the guidance device 20 transmits a guidance command from the expected location of arrival to the end of a $(k+1)^{th}$ section.

Now, with reference to FIG. 11B, the operation of estimating an expected location of arrival by the guidance device 20 will be described. In the description, it is assumed that k=1. For example, a situation is presumed where the right and left rear wheels 11b and 11c, which are drive wheels of the AGV 10, have each worn to have a shorter peripheral length, and where the degree of wear of both rear wheels is not uniform between right and left.

Figure 11B:
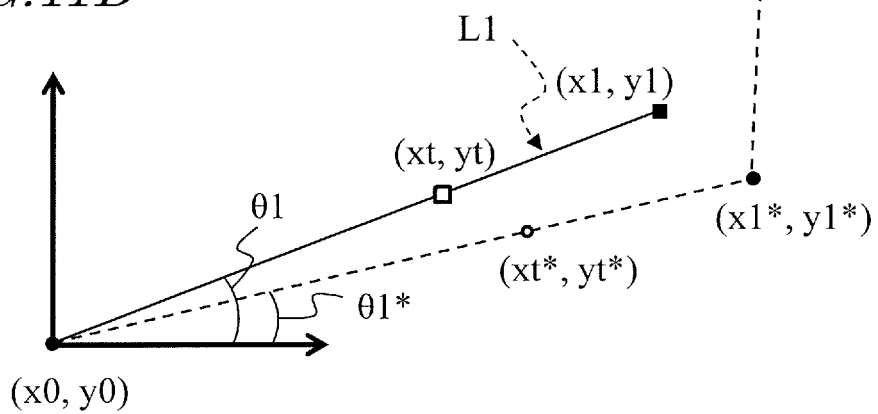
FIG. 11B is a diagram showing an example of an estimation process.

FIG. 11B shows an example of the estimation process. The broken line represents a path of the AGV 10 as presumed by the guidance device 20, whereas the solid line represents a path that has actually been traveled by the AGV 10. Although the AGV 10 should have begun traveling at an angle $\theta_1^*$ based on guidance command 1, it has begun traveling at $\theta_1$. The reason is that the degree of wear of the rear wheels is not uniform between right and left.

After the lapse of a time t, although it was initially presumed that it would be traveling at a location (xt*,yt*) shown in FIG. 11B, it is actually traveling at a location (xt,yt). Note that the distance from the location (x0,y0) to the location (xt,yt) that has been traveled before the lapse of time t is shorter than the distance from the location (x0,y0) to the location (xt*,yt*). The reason is that a rear wheel has worn so much that its peripheral length is shorter than a presumed standard value.

When a certain time t has elapsed, for example, the guidance device 20 estimates an expected location of arrival (x1,y1) of the AGV 10. The estimation can be made from the location of the AGV 10 (xt,yt), the moving direction, the remaining time to travel, and the current traveling velocity. A "remaining time to travel" is a length of time obtained by subtracting the time t from the expected traveling time. The "expected traveling time" is an amount of time for the guidance device 20 to arrive at the location (x1*,y1*) based on guidance command 1 as initially presumed. The "expected traveling time" can be calculated in advance from the traveling velocity and traveling distance of the AGV 10, for example. In order to calculate the expected traveling time more accurately, preferably the traveling velocity accounts for velocity changes from the start of travel at zero velocity until achieving constant-speed travel. As a result, the guidance device 20 is able to estimate the expected location of arrival (x1*,y1*) of the AGV 10.

Figure 11C:
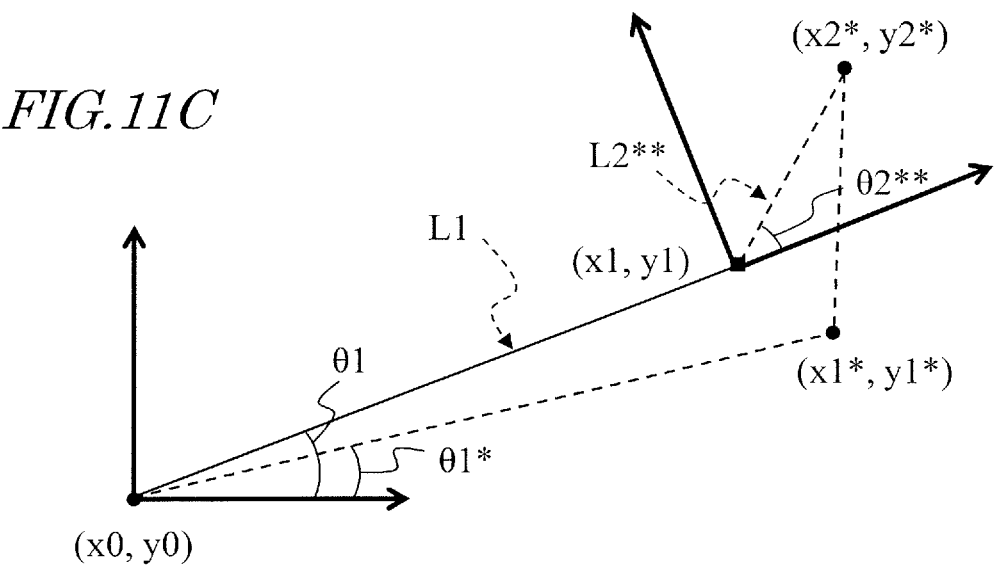
FIG. 11C is a diagram showing an exemplary operation of the AGV 10 based on guidance command 1 and a corrected guidance command 2.

Next, see FIG. 11C for step S316. The expected location of arrival (x1,y1) means the actual beginning of section 2, based on guidance command 2. Therefore, the guidance device 20 corrects the initial guidance command so that the AGV 10 will next travel from the expected location of arrival (x1,y1) to the location of arrival (x2*,y2*) in section 2. In other words, an angle $\theta_2^{}$ and a distance $L_2^{}$ from the expected location of arrival (x1,y1) to the location (x2*,y2*) are calculated. The calculated angle $\theta_2^{}$ and distance $L_2^{}$ serve as the corrected guidance command to replace the existing guidance command 2. At step S316, the guidance device 20 transmits corrected guidance command 2 to the AGV 10 a plurality of times. The reason for the "plurality of times" of transmission is that, depending on the radio condition when transmitting guidance commands from the guidance device 20 to the AGV 10, the guidance command (k+1) may possibly not be received be the AGV 10.

Figure 12:
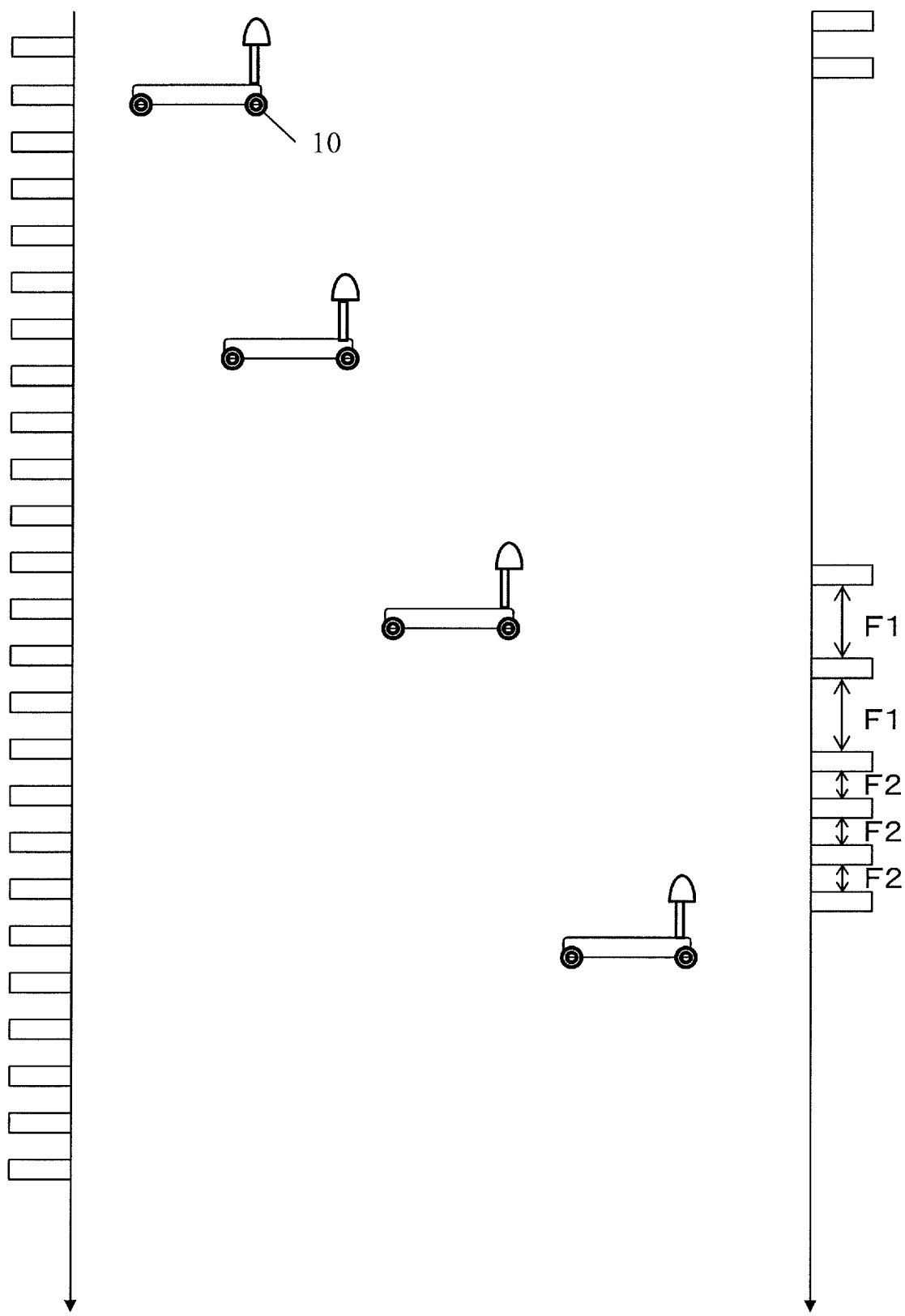
FIG. 12 is a diagram showing an example of how often a guidance command is transmitted.

FIG. 12 shows an example of how often a guidance command is transmitted. The right direction in the figure represents time; signals to be transmitted are shown along the vertical direction. The periodic pulses on the left in the figure represent oftenness of identification information (RFID) being transmitted from the AGV 10. The pulses on the right in the figure represent oftenness of guidance commands being transmitted from the guidance device 20. Once correcting the guidance command, the guidance device 20 first transmits the corrected guidance command with a period F1 for a total of three times, but as the target location of the current section is approached, it transmits the corrected guidance command three more times with a period F2 (<F1). Transmitting the corrected guidance command a plurality of times increases the chance for the AGV 10 to receive the guidance command. Furthermore, since the guidance command is transmitted with a shorter period as the target location is approached, the chance for the AGV 10 to receive it can be increased.

Note that the guidance device 20 may increase the oftenness of transmitting the guidance command (k+1) if the distance between the AGV 10 and the expected location of arrival or the remaining distance to be traveled by the AGV 10 becomes equal to or smaller than a predetermined value.

FIG. 10 is referred to again. At step S114, the AGV 10 receives the corrected guidance command 2 from the guidance device 20, and transmits an acknowledgment for the guidance command. The AGV 10 updates the guidance command for the $(k+1)^{th}$ section that has been stored in the memory 56. Table 2 shows a table in which guidance command 2 has been corrected. It can be seen that the moving direction $\theta$ and the moving amount L are updated to $\theta_2^{}$ and $L_2^{}$, respectively.

TABLE 2

| GUIDANCE COMMAND | MOVING DIRECTION (ANGLE) θ | MOVING AMOUNT (DISTANCE) L |
|---|---|---|
| 1 | $\theta_1^*$ | $L_1^*$ |
| 2 | $\theta_2^{}$ | $L_2^{}$ |
| . | | |
| . | | |
| . | | |
| p | $\theta_p^*$ | $L_p^*$ |
| . | . | . |
| . | . | . |
| . | . | . |
| N − 1 | $\theta_{N-1}^*$ | $L_{N-1}^*$ |
| N | $\theta_N^*$ | $L_N^*$ |

At step S317, the guidance device 20 receives the acknowledgment which has been transmitted from the AGV 10. At the next step S318, the guidance device 20 determines whether k+1=N or not. This is a process of determining whether the guidance command generated at step S316 is a guidance command for the $(k+1)^{th}$ section or not. If k+1=N, the guidance process by the guidance device 20 is ended. If not k+1=N, the guidance device 20 increases the value of current k by 1 at step S319, and control returns to the process of step S315.

On the other hand, until travel of the current $k^{th}$ section is finished, the AGV 10 continues traveling based on guidance command k. This means that the AGV 10 is receiving a corrected guidance command for the next $(k+1)^{th}$ section from the guidance device 20 until travel of the $k^{th}$ section is finished.

At step S115, if the AGV 10 determines that travel based on guidance command k has been completed, it is determined whether k=N or not at step S116. This is a process of determining whether the current travel is a travel based on the final guidance command N or not. If k+1=N, the AGV 10 finishes travel. If not k=N, the AGV 10 increases the value of current k by 1 at step S117, and control returns to the process of step S113.

Figure 13:
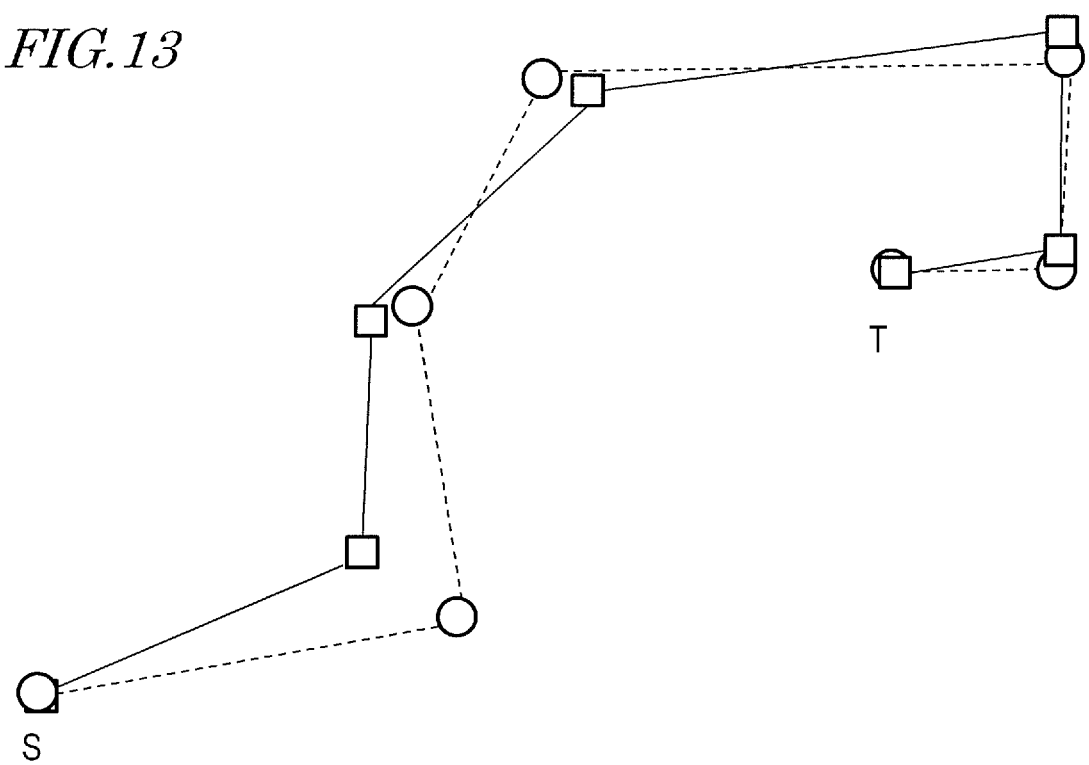
FIG. 13 is a diagram showing an initial path (broken line) that is generated by the guidance device 20 and a path (solid line) of the AGV 10 based on guidance commands as corrected in view of an actual travel of the AGV 10.

FIG. 13 shows an initial path (broken line) that is generated by the guidance device 20 and a path (solid line) of the AGV 10 based on guidance commands as corrected in view of an actual travel of the AGV 10. From the first location S to the point of final arrival T, the AGV 10 is traveling based on six guidance commands. In FIG. 2, these paths would support the loading location S for a car that has entered the car park and T in the vacant parking slot 102b.

As will be understood from FIG. 13, even if the AGV 10 arrives at a location (□) that is different from the initially-expected location of arrival (○) in each section, the guidance command is corrected so that it will again approach the target location (○) of that section in the next section. As described above, while traveling a given section, an expected location of arrival (□) in that section is estimated, and the guidance command is corrected based on the expected location of arrival as the start location of the next section. Then, before travel of the current section is completed, an update to the corrected guidance command is made for the next section. As a result, without accumulation of traveling errors in the traveling path of the AGV 10, the AGV 10 is able to arrive at the point of final arrival T relatively accurately.

Figure 14:
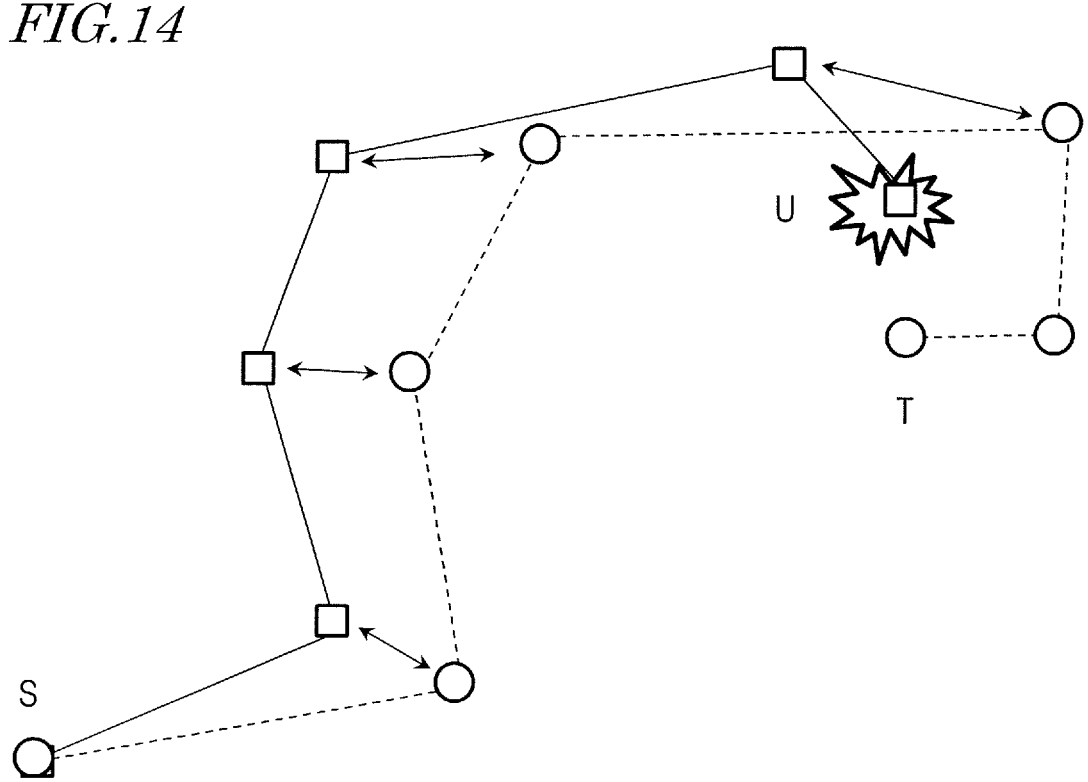
FIG. 14 is a diagram showing a traveling path of an AGV which is not subjected to the processing according to an illustrative embodiment of the present disclosure.

On the other hand, FIG. 14 shows a traveling path of an AGV which is not subjected to the processing according to the present disclosure. The broken line represents an initially-presumed path for the AGV, whereas the solid line represents a path that is actually traveled by the AGV 10.

For example, suppose that the left rear wheel, which is a drive wheel, has some wear. An example is presumed such that, even if the AGV equally rotates both rear wheels being the drive wheels, a deviation toward the left will occur. As is clear from FIG. 14, since guidance commands for all sections are transmitted altogether in advance, and are never updated later, traveling errors in the left direction are accumulated. As a result, the difference between the initial expected location of arrival (○) and the location of arrival (□) in each section gradually increases. Then, under the influences of traveling error accumulation, the AGV may contact another parked car, side wall, or the like at a location U. Such a guidance system significantly lacks in reliability.

Note that a calibration for the motors 15b and 15c of the AGV 10 may be performed by presuming the aforementioned situation where the right and left rear wheels being the drive wheels do not have uniform wear. For example, the microcontroller 55 may rotate the motors 15b and 15c of the AGV 10 with the same rotational speed but in opposite directions. If the right and left rear wheels have uniform wear, the AGV 10 will rotate while remaining in that place. However, if the right and left rear wheels do not have uniform wear, the location of the AGV 10 will gradually deviate. Accordingly, the microcontroller 55 of the travel control unit 17 calculates rotational speeds that will not result in a deviated location by making one rotation faster than the other rotation. It can be determined whether the AGV 10 is undergoing a rotational motion or not from an integral value of the output values of the gyroscope 14c. After rotational speeds for the motors 15b and 15c that will not result in a deviated location are calculated, for example, the microcontroller 55 may retain information of the difference or ratio between the respective rotational speeds of the motors 15b and 15c, and retain it for use in subsequent processes.

For example, suppose it is found that the location of the AGV 10 does not deviate when the rotational speed of the motor 15c is M times as large as the rotational speed of the motor 15b. Thereafter, the microcontroller 55 of the travel control unit 17 will rotate the motor 15c with an M times rotational speed. As a result, the AGV 10 will be able to travel straight. Note that, once a motor calibration is made, the relationship between the numbers of revolutions of the motors and the traveling distance may also change. Therefore, the microcontroller 55 may perform a process of calculating distance from the numbers of revolutions of the wheels.

In the above description, it is illustrated that each guidance command contains information designating an angle indicative of the moving direction of the AGV 10 and a distance indicative of the moving amount of the AGV 10; accordingly, each "section" is a straight line. However, as another example of information to be contained in a guidance command, information of a radius R of rotation during turning of the AGV 10 may be contained.

Figure 15A:
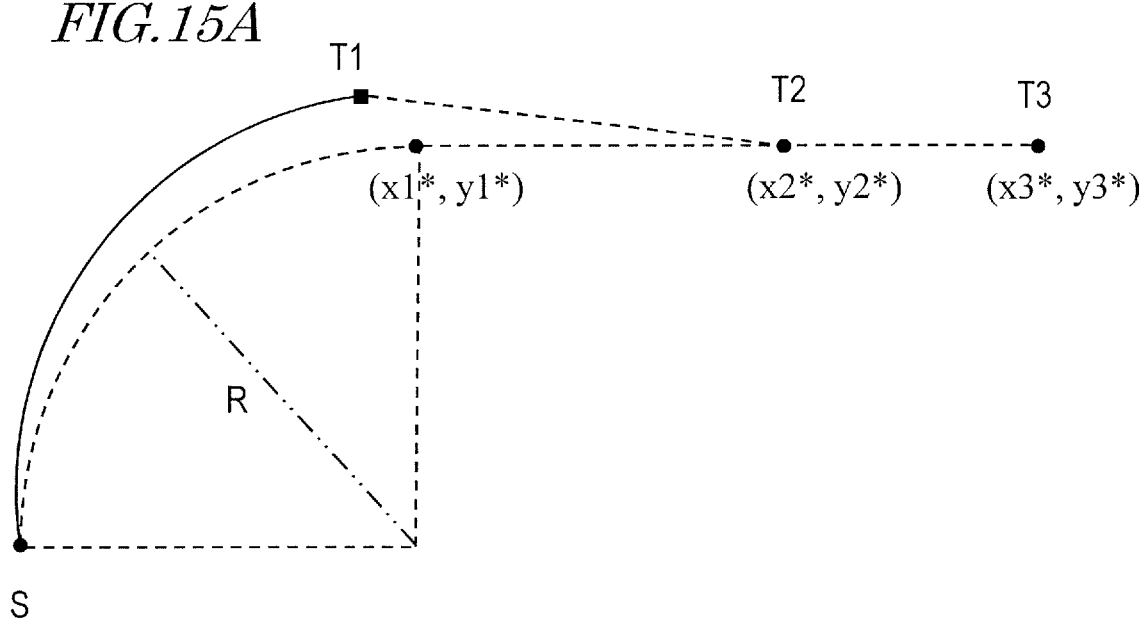
FIG. 15A is a diagram showing a path of an AGV 10 based on guidance commands, as corrected in view of an initial path (broken line) of the AGV 10 that includes a turn section with a radius R of rotation and an actual traveling path (solid line)of the AGV 10.
Figure 15B:
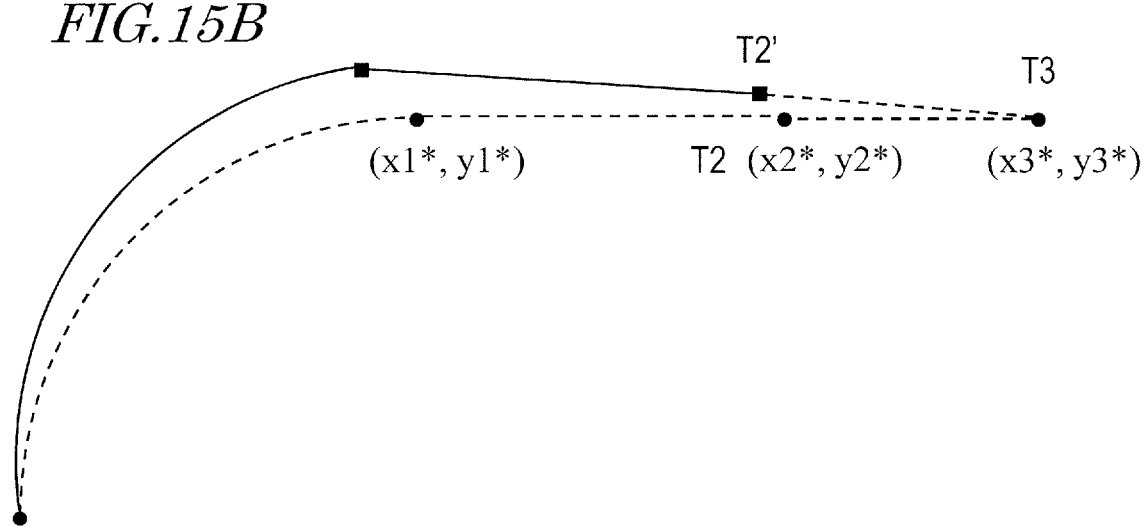
FIG. 15B is a diagram showing a path of an AGV 10 based on guidance commands, as corrected in view of an initial path (broken line) of the AGV 10 that includes a turn section with a radius R of rotation and an actual traveling path (solid line) of the AGV 10.

FIGS. 15A and 15B show a path of an AGV 10 based on guidance commands, as corrected in view of an initial path (broken line) of an AGV 10 that includes a turn section with a radius R of rotation and an actual traveling path (solid line) of the AGV 10. As in the above process, it is assumed that guidance commands for all sections are transmitted from the guidance device 20 to the AGV 10 in advance.

As shown in FIG. 15A, before the end of the turn section, the guidance device 20 estimates an expected location of arrival T1 in the turn section, and corrects the guidance command from that location toward a target location T2 in the next section. The AGV 10 travels the next section based on the corrected guidance command.

As shown in FIG. 15B, the guidance device 20 estimates an expected location of arrival T2' for the AGV 10 in the next section to be traveled, and corrects the guidance command toward a target location T3 in a still next section. Thus, the guidance device 20 can cause the AGV 10 to travel in a manner of turning.

Next, an operation in which the AGV 10 while traveling each section corrects traveling errors will be described.

Figure 16:
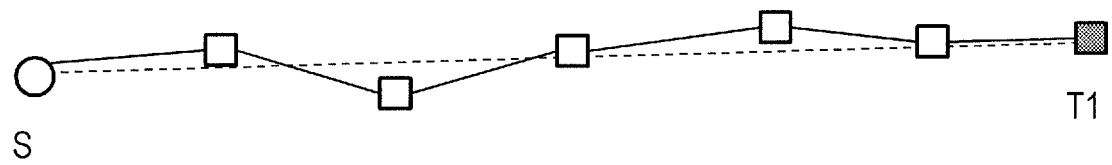
FIG. 16 is a diagram showing a path of the AGV 10 in a section from a location S to a target location T.

FIG. 16 shows a path of the AGV 10 in a section from a location S to a target location T. The broken line represents a path connecting from the location S to the target location T with a straight line, whereas the solid line represents a path that has been followed by the AGV 10.

By using the gyroscope 14c, the AGV 10 corrects deviations from an angle as instructed with a guidance command. Specifically, the microcontroller 55 of the AGV 10 integrates angular velocity values that are output from the gyroscope 14c, and determines an angle of deviation from the initial traveling direction, i.e., a deviation from an orientation toward a target location during travel. The microcontroller 55 controls the motor control circuits 58b and 58c so that the deviation is reduced, and more preferably the angle is zeroed, thus adjusting the rotational speeds of the motors 15b and 15c. As the AGV 10 adjusts its own traveling direction, the traveling path can be followed more accurately. As for any remaining deviation, correction of the guidance command by the guidance device 20 is still needed.

If the current location of the AGV 10 has a significant discrepancy from the path to be followed with an initial guidance command which is transmitted from the guidance device 20, it is no longer possible to correct the traveling errors by using the gyroscope 14c. In such cases, the guidance device 20 may again transmit to the AGV 10 a guidance command for returning to the path which is in accordance with the initial guidance command, so as to bring the AGV 10 back on the initially presumed path.

Note that the AGV 10 is able to transmit, to the guidance device 20, information of an angle of deviation from the initial traveling direction as output from the gyroscope 14c. As a result, the guidance device 20 is able to know the current traveling direction of the AGV 10 more accurately, and determine an accurate moving direction when correcting the guidance command.

Thus, exemplary guidance systems according to the present disclosure have been described. Next, variants will be described.

The processes shown along the vertical direction in FIG. 9 and FIG. 10 above are processes to be performed by the microcontroller 55 of the AGV 10, the CPU 25 of the guidance device 20, and the CPU 35 of the positioning device 30, which can be grasped as a flowchart. These processes can be implemented as a computer program containing a plurality of instructions. The computer program is laid out on each the respective memory.

In the present disclosure, the guidance device 20 and the positioning device 30 are illustrated as separate apparatuses. However, the guidance device 20 and the positioning device 30 may be integrated. For example, the guidance device 20 may have a function corresponding to the function of the positioning device 30, and measure location information of the AGVs and generate guidance commands. In that case, the guidance device 20 is connected to the antenna elements 34a, and the CPU 25 of the guidance device 20 performs the positioning process.

In the present disclosure, the path from a current location of an AGV to a final target location that was set in advance is divided into a plurality of sections, and the guidance device 20 generates a guidance command in each section for guiding toward a destination. However, the final target location may be altered during travel of the AGV. In that case, the guidance device 20 may allow the path from the current location of an AGV to the altered final target location to be again divided into a plurality of sections, and generate a guidance command in each section for guiding toward a next destination.

In the present disclosure, acquisition of location information and generation/correction of a guidance command may not necessarily be in synchronization. For example, location information of the AGV 10 may indicate that the current location of the AGV 10 has no deviation from the initial path, and therefore that the guidance command does not need to be corrected. In that case, the guidance device 20 will acquire location information from the positioning device 30, but will not generate a guidance command. Therefore, the guidance device 20 will abstain from transmitting a guidance command for a next section of the section being currently traveled. Alternatively, instead of correcting a guidance command for the next section, the guidance device 20 may transmit to the AGV 10 a command to travel by straightforwardly utilizing the guidance command for the next section itself.

The above description illustrates that the guidance device guides AGVs in a car park. However, a car to be transported may itself have the functionality of an AGV, for example. For instance, suppose that a car which is going to be parked has an autonomous driving function of automatically driving without a driver's manipulations, a transmission function of transmitting its own identification information (RFID), and a reception function of receiving guidance commands. In other words, such a car may have a construction that is equivalent or similar to the construction shown in FIG. 6. For example, an engine may be used as the power source. Such a car will communicate with a guidance device that is provided in a car park, receive guidance commands, and perform autonomous driving in accordance with the guidance commands. The guidance device 20 may measure the location of the car by using the positioning device 30, and transmit a guidance command that is corrected through the aforementioned processes. The car will travel the next section in accordance with the corrected guidance command, and move to the parking location.

2. An AGV Guidance Operation Using a Vehicle Guidance System According to the Present Embodiment (FIGS. 17 through 27)

Next, a vehicle guidance system according to the present embodiment and an AGV guidance operation using the vehicle guidance system will be described.

Figure 17:
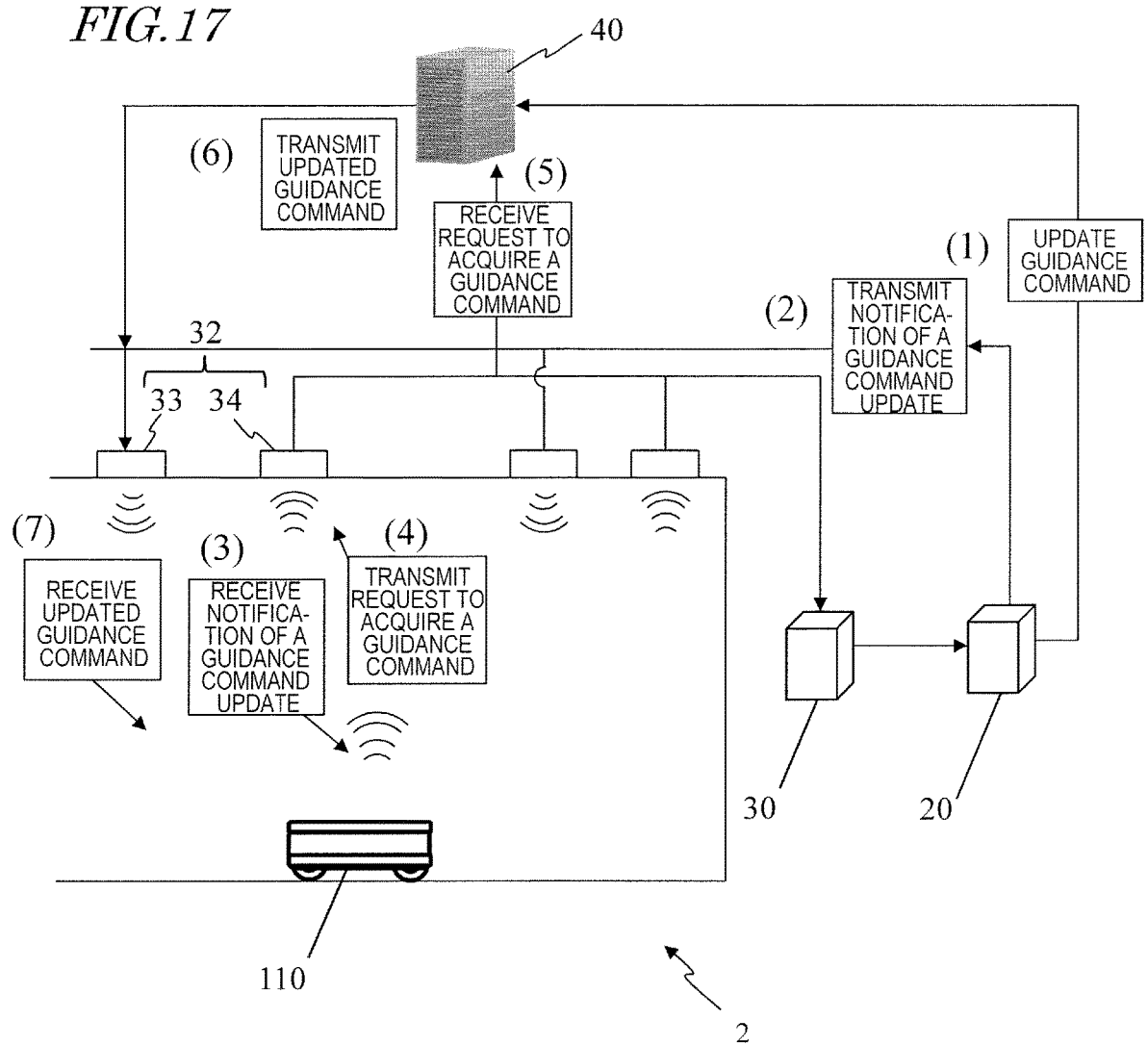
FIG. 17 is a diagram showing the construction of a vehicle guidance system 2 according to an illustrative embodiment of the present disclosure.

FIG. 17 shows the construction of a vehicle guidance system 2 according to the present embodiment. Hereinafter, the vehicle guidance system 2 will be abbreviated as "guidance system 2".

The guidance system 2 includes a guidance device 20, a positioning device 30, a file server 40, and an AGV 110.

In the following, unless otherwise specified, the construction and operation of the guidance device 20 and the positioning device 30 of the guidance system 2 are identical to those in the guidance system 1 (Section 1). Therefore, the respective descriptions in the guidance system 1 (Section 1) will be relied on.

The file server 40 is connected with the guidance device 20 and the AGV 110 so as to be capable of communication. The file server 40 stores a guide command for each vehicle which is generated by the guidance device 20. In response to receiving a request to acquire a guidance command that is transmitted from the AGV 110, the file server 40 reads a guidance command for the AGV 110 that transmitted the request. Then, the file server 40 transmits the guidance command to that AGV 110.

Figure 18:
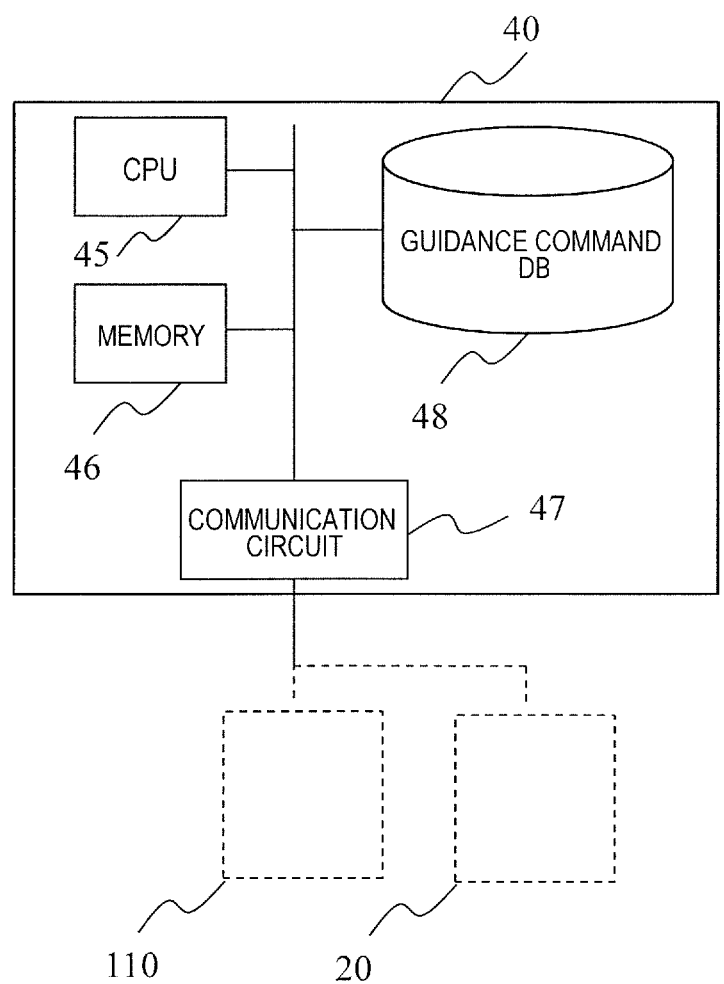
FIG. 18 is a diagram showing the hardware construction of a file server 40.

FIG. 18 shows the hardware construction of the file server 40.

The file server 40 includes a CPU 45, a memory 46, a communication circuit 47, and a storage device 48, which are connected via an internal bus.

The CPU 45 controls the operation of the file server 40. The memory 46, which may be e.g. a DRAM, is a work memory to be used in connection with processing by the CPU 45. For example, the CPU 45 loads a computer program (basic software) of an operating system (OS) to the memory 46, and further loads to the memory 46 a server program (application software) to be executed on the OS. As a result, the processing that is described below is achieved.

The communication circuit 47 is, for example, a communication circuit which includes one or more communication connectors to perform wired communications under the Ethernet (registered trademark) standards. The communication circuit 47 receives a guidance command from the guidance device 20, and stores it to the storage device 48. Moreover, the communication circuit 47 receives a request to acquire a guidance command from the AGV 110, and transmits the requested guidance command to the AGV 110 via transmission antennas 33 of relay devices 32.

The storage device 48 is a hard disk drive (HDD) or a solid state drive (SSD), for example. The storage device 48 has a sufficient recording area for storing the guidance command(s) that has been generated by the guidance device 20.

Figure 19:
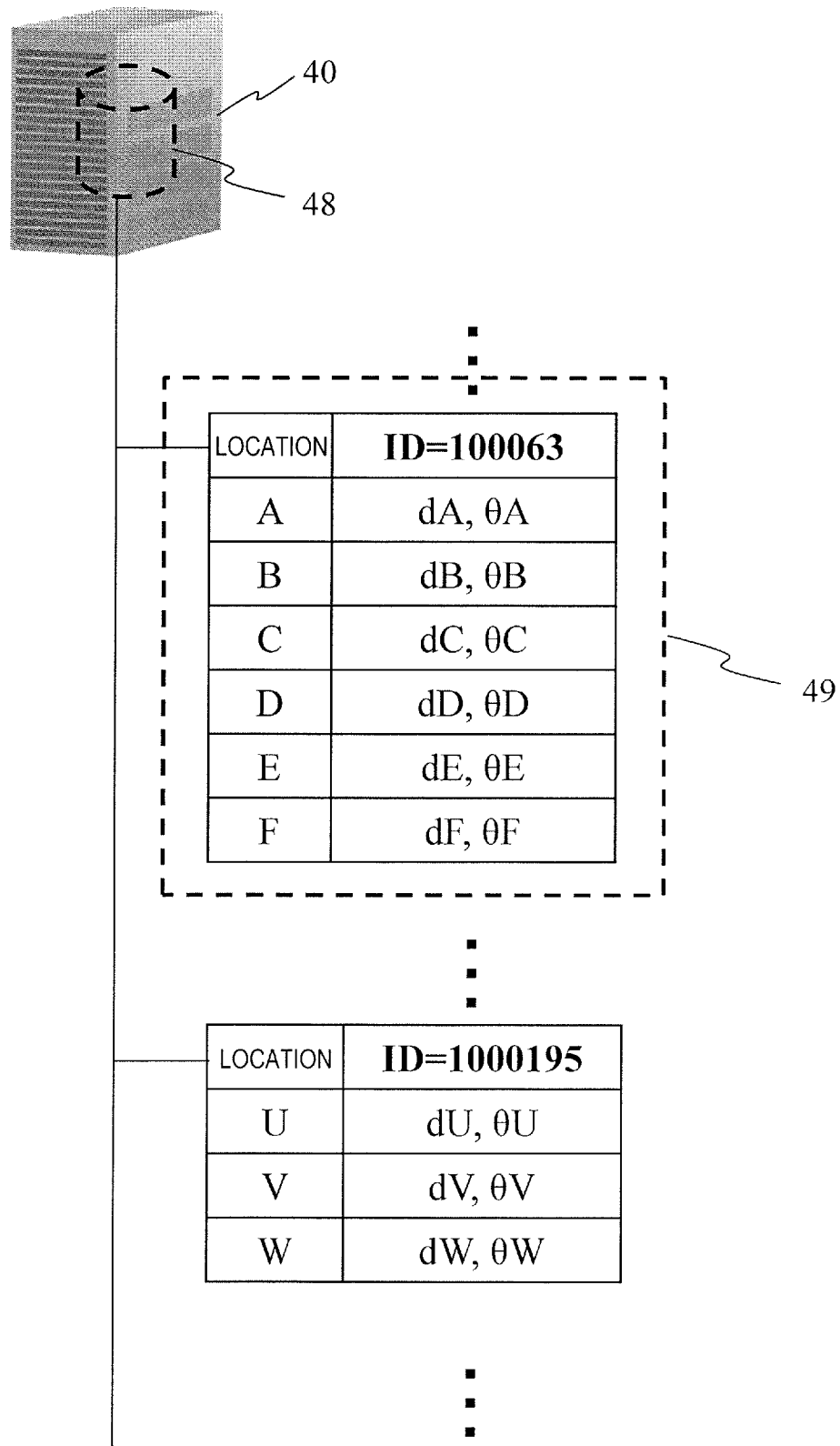
FIG. 19 is a diagram showing an example of a guidance command 49 stored in a storage device 48 of the file server 40.

FIG. 19 shows an example of a guidance command 49 stored in the storage device 48 of the file server 40. In the present embodiment, as an instance, it is assumed that one guidance command contains location information of a plurality of locations in advance. Note that, generally speaking, "location information" may be regarded as information indicating absolute locations within a region. In the present specification, "location information" includes information of a direction and distance concerning a $(k+1)^{th}$ location as viewed from a $k^{th}$ location (k: a positive integer).

FIG. 19 shows a guidance command 49 for an AGV 110 whose identification information is "100063". In the guidance command 49, for each of locations A through F, an angle ex indicating a moving direction for the AGV 110 and a distance dx (x: A, B, C, D, E, F) to be traveled are designated. Locations A through F are location information of a plurality of points of passage defining a traveling path for the vehicle.

Before arriving at location A, or after arriving at location A, the AGV 110 transmits to the file server 40 a request to acquire a guidance command 49, and acquires the guidance command 49 from the file server 40. As a result of this, the AGV 110 is able to move from location A.

FIG. 17 is referred to again. Typically, the guidance system 2 shown in FIG. 17 is installed, by an entity which provides services based on the guidance system 2, in a factory of the user company. In other words, it is presumably likely that the guidance device 20, the positioning device 30, the file server 40, and the AGV 110 are installed on the premises of the same factory.

However, the guidance device 20, the positioning device 30, and the storage device 40 do not need to be installed on the premises of the same factory, but may be installed in different locations. For example, the guidance device 20 may be installed on the premises of an entity who provides the guidance system 2, the positioning device 30 on the premises of an entity who provides a positioning service, and the storage device 40 on the premises of an entity who operates a so-called cloud storage to provide a file storing service.

Note that, in the case where the positioning device 30 measures the location of the AGV 110 through the aforementioned positioning process (a), for example, the reception antenna 34 may be installed in any location where it can receive radio signals which are transmitted from the AGV 110. The positioning device 30 only needs to be able to receive signals which are received by the reception antenna 34.

The AGV 110 has a different appearance and internal construction from that of the AGV 10.

Figure 20:
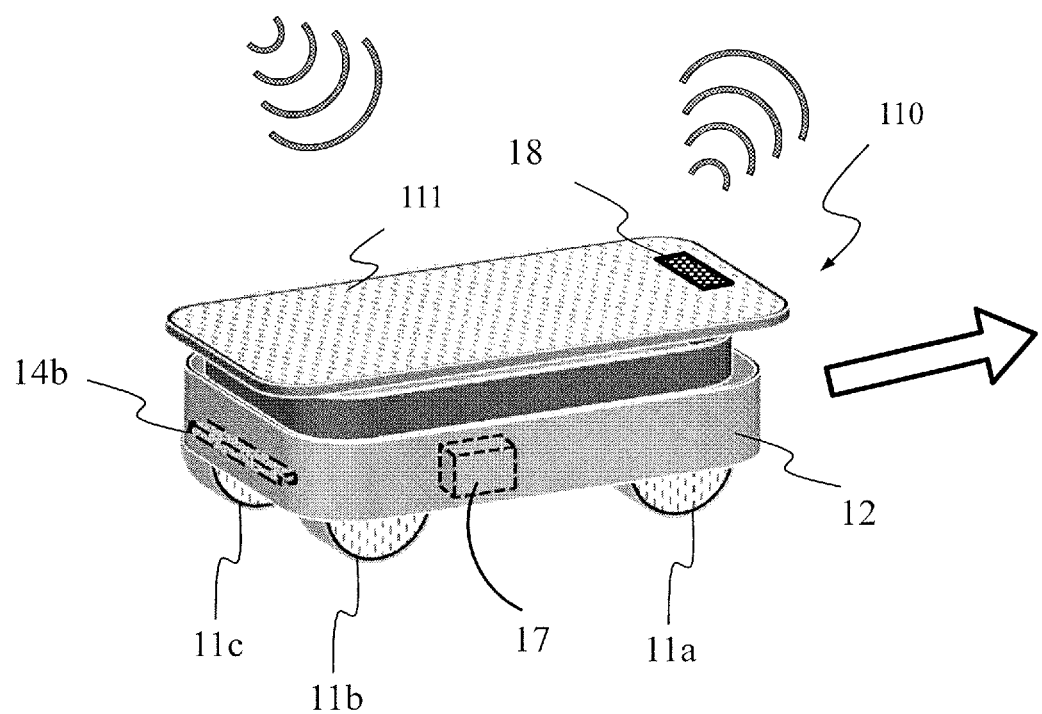
FIG. 20 is an outer view of an illustrative AGV 10 according to an illustrative embodiment of the present disclosure.

FIG. 20 is an outer view of an illustrative AGV 10 according to the present embodiment. The AGV 110 includes: a carrying table 111 on which an object to be carried is placed; a front bumper switch 14a; a rear bumper switch 14b; a travel control unit 17; an IC tag 18; and four wheels 11a through 11d. Note that FIG. 20 shows the front wheel 11a, the rear wheels 11b and 11c, and the rear bumper switch 14b, while the front wheel 11d and the front bumper switch 14a are obscured by a frame 12.

Figure 21:
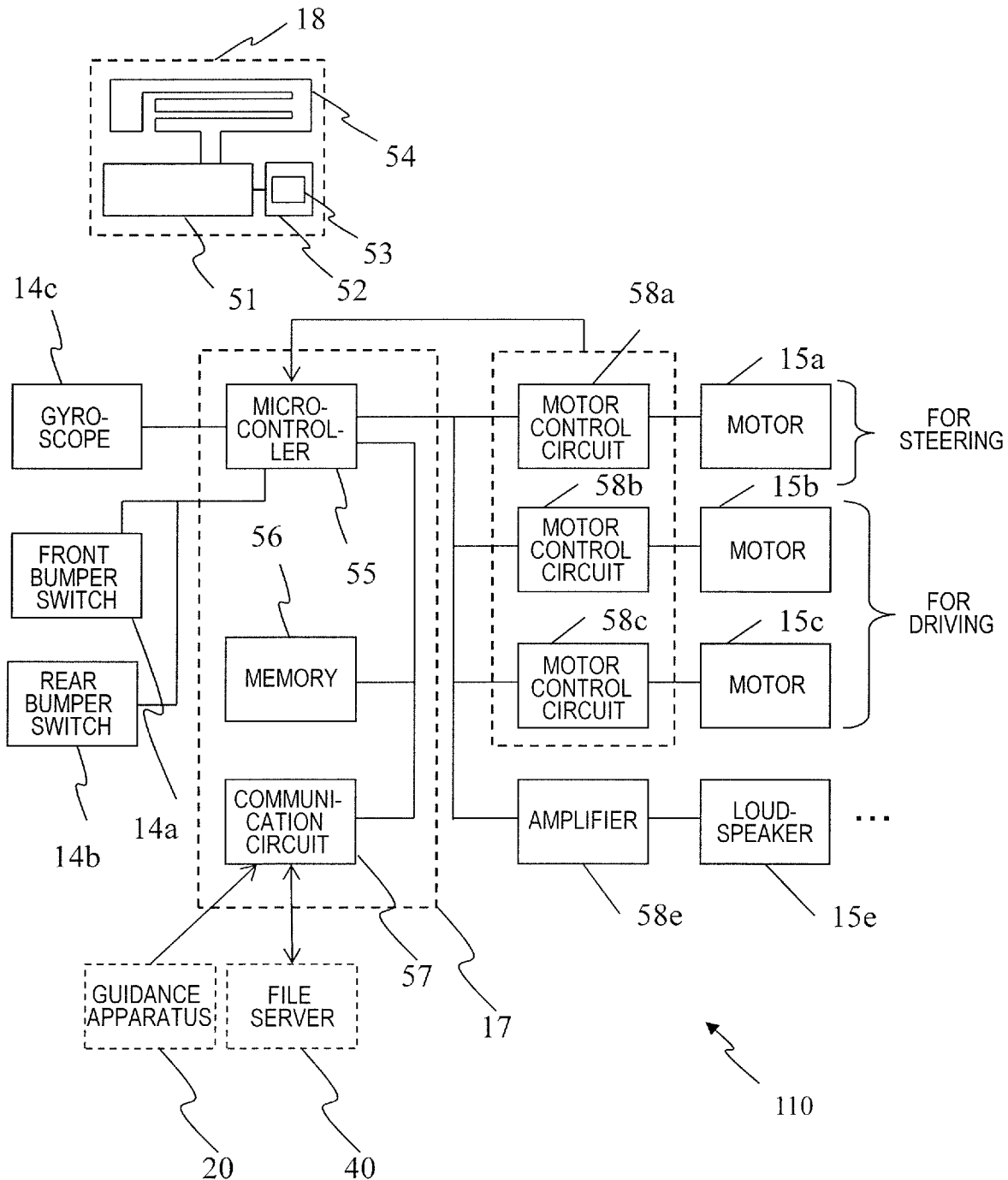
FIG. 21 is a diagram showing a hardware construction of an AGV 110.

FIG. 21 shows the hardware construction of the AGV 110.

A communication circuit 57 of the AGV 110 is able to communicate also with the storage device 40. In the present embodiment, the AGV 110 receives from the guidance device 20 a notification that a guidance command has been updated, and receives the updated guidance command from the storage device 40.

The AGV 110 lacks the motor 15d for lifting a car and the motor control circuit 58d which were provided in the AGV 10. On the other hand, the AGV 110 includes an amplifier 58e and a loudspeaker 15e. As will be described later, the positioning device 30 is able to measure the location of other AGVs within the factory which is traveled by the AGV 110, and/or a person bearing an IC tag. In that case, in order to call attention, an audio signal may be amplified by the amplifier 58e, and an audio may be output from the loudspeaker 15e by using the audio signal. Details of the process will be described later.

FIG. 17 is referred to again. FIG. 17 shows processes (1) to (7) to be performed in the guidance system 2. These will be described in order below. It is assumed that a guidance command is stored in the storage device 48 of the file server 40 as shown in FIG. 19 in advance.

In the following description, what operates is illustrated as the guidance device 20, the file server 40, and the AGV 110; in actuality, however, what operates is the microcontroller 55 of the AGV 10, the CPU 25 of the guidance device 20, and the CPU 45 of the file server 40, which transmit or receive information via their respective communication circuits.

The guidance device 20 updates a guidance command when a predetermined condition is satisfied. The "predetermined condition" may be that, for example, due to a deviation during travel of the AGV 110, an expected location of arrival of the AGV 110 has been deviated by a predetermined level or more from the location of the initial point of passage.

(1) The guidance device 20 transmits an updated guidance command for the AGV 110 to the file server 40. The file server 40 replaces the identification information of the AGV 110 that has already been retained, with the newly received guidance command. To the guidance device 20, the file server 40 transmits a notification of update completion indicating that an update of the guidance command is completed.

Figure 22:
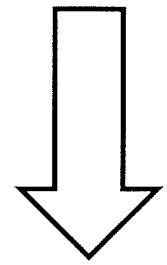
FIG. 22 is a diagram showing an example of a guidance command before and after an update.

FIG. 22 shows an example of a guidance command before and after an update. In the example of FIG. 22, moving directions and distances for the sections beginning from points of passage C, E and F have been updated. For example, due to a deviation in the travel of the AGV 110, the point of passage C is altered to an expected location of arrival C*, with its moving direction and distance being updated so that a travel will be made to location D beginning from location C*. Moreover, points of passage E and F are updated to a different moving direction and a different distance so that, because of e.g. an emerging situation that makes it impossible to travel a path which was set for the AGV 110 to follow, a detour route will be taken toward a point of final arrival.

FIG. 17 is referred to again.

(2) When the notification of update completion is received, the guidance device 20 transmits a notification of a guidance command update to the AGV 110.

(3) The AGV 110 receives the notification of a guidance command update from the guidance device 20. This notification allows the AGV 110 to know that the guidance command that is applicable to itself has been updated.

(4) In response to receiving the notification of a guidance command update, the AGV 110 transmits to the file server 40 a request to acquire a guidance command. Note that information that identifies the file server 40 on a network (e.g., an IP address) is retained in the AGV 110 in advance.

(5) The file server 40 receives the request to acquire a guidance command from the AGV 110.

(6) From the storage device 48, the file server 40 reads the guidance command for the AGV 110 that was updated in process (1), and transmits it to the AGV 110.

(7) the AGV 110 receives the updated guidance command from the file server 40. As a result, the AGV 110 is able to replace the existing guidance command with the newly received guidance command.

In the above process, a notification of an update of the guidance command is transmitted only to the AGV 110 for which an update of the guidance command has been made. At the time of receiving the request to acquire a guidance command from the AGV 110, the file server 40 may read the guidance command, and transmit it to the AGV 110. As compared to an implementation where all AGVs 110 check with the file server 40 for updates on a regular basis, the process according to the present embodiment imposes a lighter communications load, and allows the processing load for the storage device to be suppressed.

The method of acquiring an updated guidance command by utilizing notifications may be regarded as an application of a chat system under a social networking service (SNS). In other words, a situation may be contemplated where each AGV 110 and the guidance device 20 are having dialogs. Each AGV 110 knows from a notification from the guidance device 20 that a guidance command has been updated, and on that basis is able to acquire the guidance command from the file server 40 as an update. Until a notification is received, it may be assumed that no update of the guidance command has been made, and the AGV 110 may continue moving in accordance with the currently-retained guidance command.

Note that the AGV 110 may access the file server 40 even before receiving any notification from the guidance device 20. For example, when travel of the current section is finished, i.e., when the nearest point of passage is arrived at, the AGV 110 may access the file server 40. By accessing the file server 40 at the time of arriving at each point of passage, it is possible to update the guidance command for the AGV 110 even if a notification fails to be received due to a temporary deterioration, etc., of the communications environment.

Next, another example concerning an update of the guidance command will be described. The following example is one of the "predetermined conditions" for updating a guidance command.

The AGV 110 may be asked to bring what it is carrying to another AGV, or a person. In this case, the guidance device 20 generates a guidance command such that the location of the other vehicle or the person is set as a point of passage or a point of final arrival for the AGV 110.

However, the other vehicle or the person may move, thereby making it necessary to correct the point of passage and destination as designated by the initial guidance command. It is assumed that the other AGV has the IC tag 18, or that the person is bearing an IC tag. The positioning device 30 is able to measure the location of the other vehicle or the person.

Figure 23A:
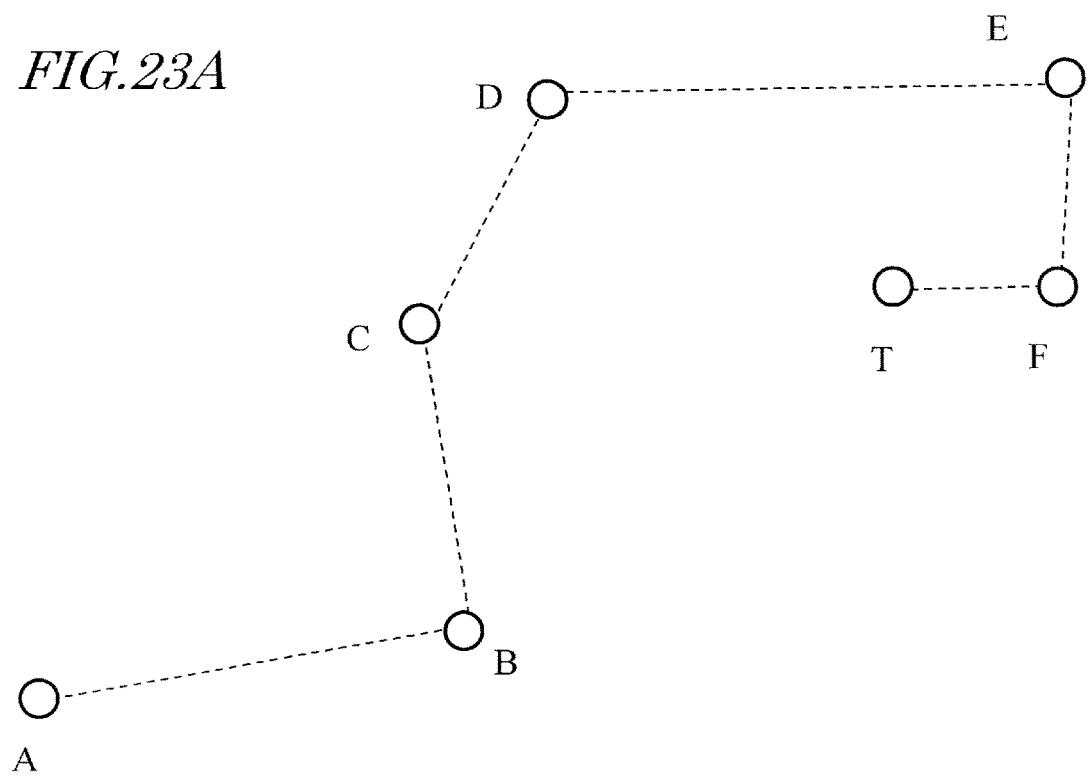
FIG. 23A is a schematic diagram showing a path as initially determined by the guidance device 20.

FIG. 23A is a schematic diagram showing a path as initially determined by the guidance device 20. A path is set that leads through points of passage A through F to a point of final arrival T. The guidance device 20 generates a guidance command for moving the AGV 110 along the path shown in FIG. 23A.

Figure 23B:
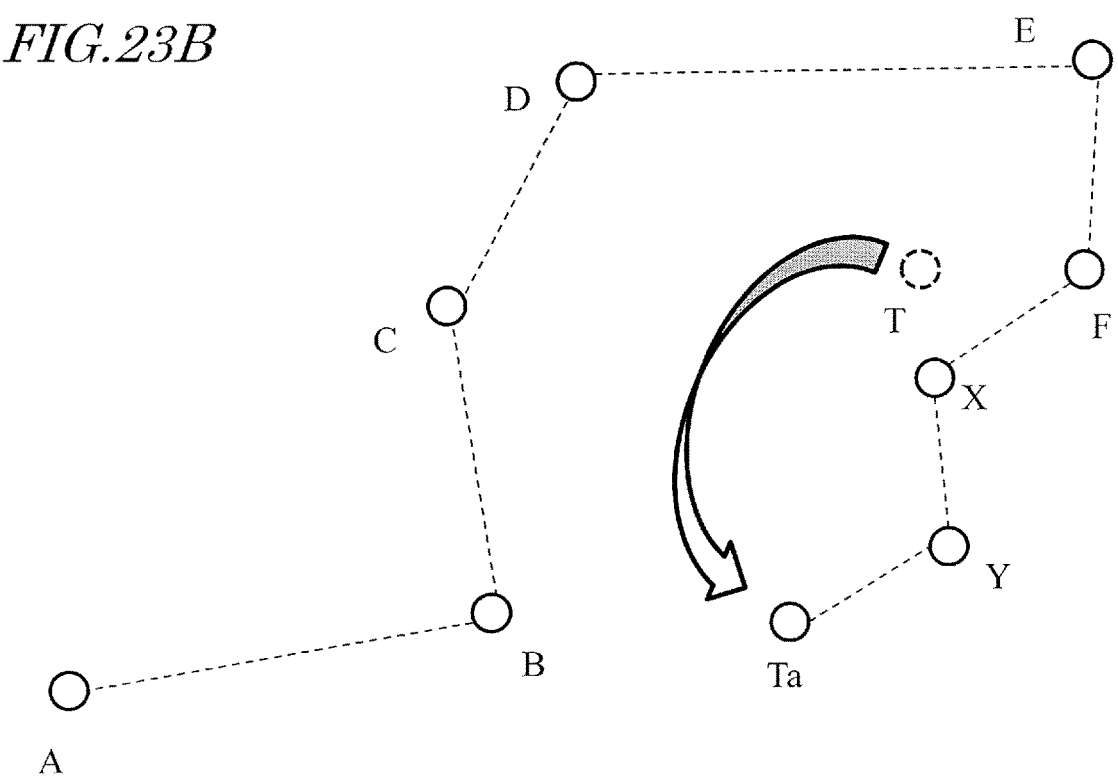
FIG. 23B is a diagram showing a path as adapted to a point of final arrival Ta.

A situation is presumed where, after the AGV 110 acquired the aforementioned guidance command, another vehicle or a person that existed at the point of final arrival T has moved to a different point Ta. FIG. 23B shows a path as adapted to the point of final arrival Ta. In the altered path, points of passage X and Y are newly added before arriving at the point of final arrival Ta.

Figure 24:
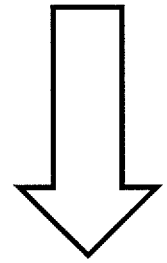
FIG. 24 is a diagram showing an example of a guidance command before and after an update.

FIG. 24 shows an example of a guidance command before and after an update. In the updated guidance command, a moving direction and a distance as beginning from the point of passage F are altered to dF and θF, respectively, and furthermore points of passage X and Y are added.

As the other vehicle or the person moves, the positioning device 30 measures the location of the other vehicle or the person, and the guidance device 20 updates the guidance command. This allows the AGV 110 to move so as to follow the movement of the other vehicle or the person.

The number of points of passage in the initial path (FIG. 23A), and the number of points of passage (including the number of added points of passage) in the altered path (FIG. 23B), mentioned in above-described example, are only exemplary.

In the above description, it is illustrated that the file server 40 and the AGV 110 replace an existing guidance command with an updated guidance command; however, this is an example. The file server 40 and/or the AGV 110 may alter at least a portion of the plurality of points of passage. For example, the guidance command may be rewritten only as to the portion(s) where the moving direction and distance have been altered.

Since the positioning device 30 is able to measure the location of a person bearing an IC tag, the guidance command may be further extended so that an operation in accordance with the locations of people will be performed. Suppose for example that, in a section which is subsequent to a currently-traveled section, the guidance device 20 has detected that a person exists on the traveling path of the AGV 110 or within 5 m from the traveling path, based on a measurement result by the positioning device 30. The guidance device 20 updates the guidance command so that an audio signal will be output in the section where the person exists. In other words, the guidance command encompasses not only commands as to direction and distance, but also a command to output an audio.

FIG. 25 shows an exemplary guidance command having an audio output flag. In a section where the audio output flag is 1, the AGV 110 outputs an audio from the loudspeaker 15*e*. For example, in the unaltered guidance command, the audio output flag is 0 in all sections, but after the alteration, the audio output flag is altered to 1 in the section from the point of passage C. Once the altered guidance command is stored to the file server 40, the guidance device 20 transmits a notification to the AGV 110 so that the guidance command for the AGV 110 will be updated. As a result, in the section where the audio output flag is 1, attention of any person nearby can be called.

Instead of an audio output, flickering light may be used to call attention of a person, for example. In the present specification, a device for calling the attention of a person, including the amplifier 58*e* and the loudspeaker 15*e* for generating a sound and a lamp for activation/deactivation of light, may be referred to as an "alarming device".

Note that, even in the currently-traveled section, it may be desirable to call the attention of a person by using an alarming device. In such a case, the alarming device may be operated by a different method from updating a guidance command, e.g., transmitting an alarm notification from the guidance device 20 to the AGV 110.

In the above embodiment, it is illustrated that a guidance command includes, as location information, a distance and direction from a given point of passage to a next point of passage. Such a description format is only an example, and other various description formats may be possible. For example, in a region for movement of AGVs, an X coordinate axis and a Y coordinate axis may be set, these two being orthogonal to each other, and location information may be described by utilizing the two coordinate axes.

A first example is a description format where a difference value in the X direction and a difference value in the Y direction ($\Delta X$ and $\Delta Y$) from a given point of passage to a next point of passage are each adopted as location information.

When adopting this description format, information $\alpha$ indicating how much the current orientation of an AGV is deviated from the X direction or the Y direction is needed. Therefore, at the start of the operation, the microcontroller 55 of an AGV (FIG. 6, FIG. 21) may acquire from the guidance device 20 information as to how much the direction in which itself is currently oriented is deviated from the X direction or the Y direction, for example. Thereafter, the microcontroller 55 integrates further changes in angle by utilizing the gyroscope 14c, and acquire information a as to the angle of deviation from the X axis direction or the Y axis direction.

From a current location of an AGV to a next point of passage, a distance D is derived as $D=(\Delta X^2+\Delta Y^2)^{1/2}$, and an angle $\beta$ is derived as $\beta=\tan^{-1}(\Delta Y/\Delta X)$. The AGV may change its moving direction by ($\beta-\alpha$), and advance by the distance D.

A second example is a description format where absolute coordinates, expressed in terms of an X coordinate and a Y coordinate, are adopted as location information. For example, suppose that a guidance command expresses the location of each point of passage in absolute coordinates. Further suppose that each time an AGV finishes traveling each section, the guidance device 20 conveys the current location of the AGV in the form of absolute coordinates. Once the microcontroller 55 of the AGV calculates a difference between the coordinates of the current location and the coordinates of the location of the next point of passage, then adaptation to the aforementioned implementation using $\Delta X$ and $\Delta Y$ is possible. Thereafter, by using the same method as in the first example, the AGV is able to move toward the next point of passage.

In the above-described embodiment, in the case where a plurality of AGVs exist, the guidance device generates a guidance command for each AGV, and updates it. Every AGV transmits a request to acquire a guidance command to the file server 40, and receives a guidance command from the file server 40. However, when many AGVs within the guidance system perform communications with the file server 40 at moments that are relatively close to one another, the amount of communication data may temporarily increase, possibly causing delayed communications.

Hereinafter, an example where the amount of communication data to be transmitted/received within the guidance system can be suppressed will be described.

Figure 27:
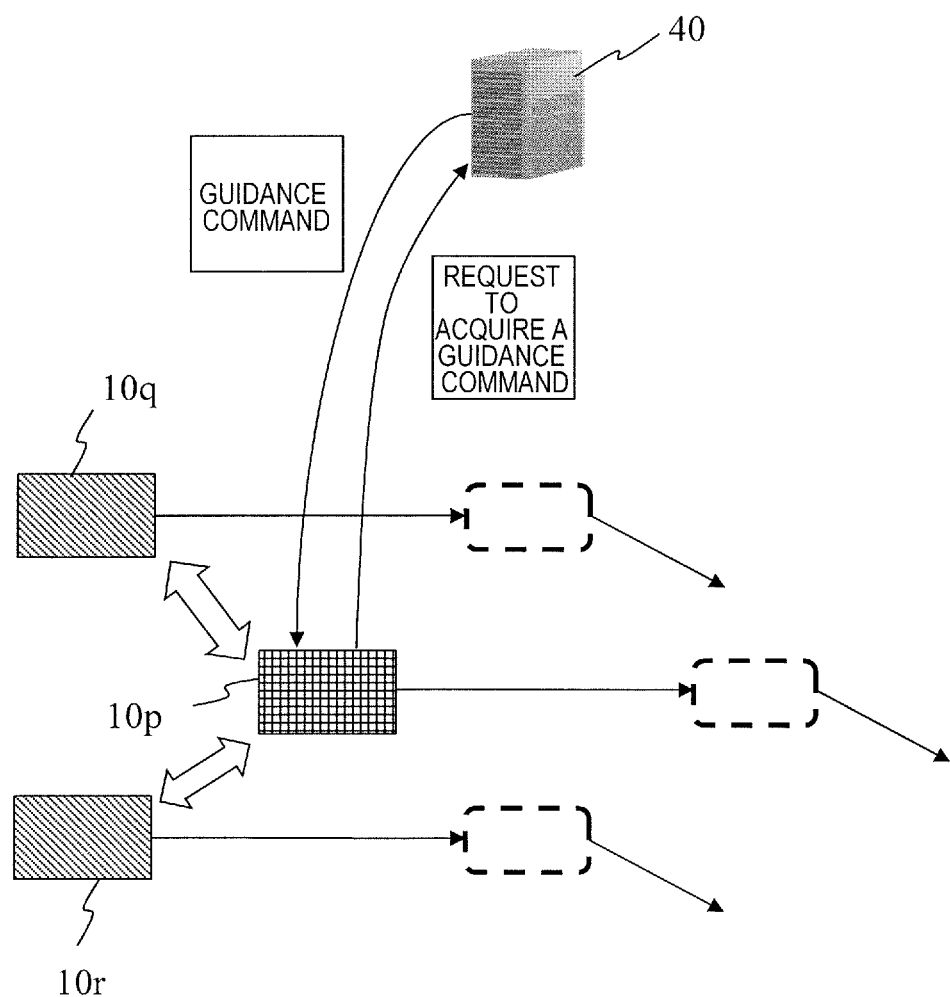
FIG. 27 is a diagram illustrating an example where three AGVs 10p, 10q and 10r are made to undergo the same motion.

FIG. 27 is a diagram illustrating an example where three AGVs 10p, 10q and 10r are made to undergo the same motion. It is assumed that, while maintaining the relative positioning (distance and angle) between one another, the three AGVs 10p, 10q and 10r are made to move in the same direction and by the same distance.

Among the three AGVs, the AGV 10p performs communications with the file server 40. The AGV that performs communications with the file server 40 will be referred to as the "reference AGV".

On the other hand, the AGVs 10q and 10r do not perform communications with the file server 40. The reason is that, in this example, each of the AGVs 10q and 10r moves while maintaining their relative positioning with the reference AGV 10p. The relative positioning means, for example, an angle and distance of the reference AGV 10p as viewed from each of the AGVs 10q and 10r. Since the AGVs 10q and 10r move so as to follow the motion of the reference AGV 10p, they do not need to perform communications with the file server 40.

The AGVs 10q and 10r include a sensor which is capable of contactlessly detecting the reference AGV 10p. Examples of the sensor that may be used herein include an ultrasonic sensor, a laser range finder, and a proximity sensor.

An "ultrasonic sensor" is a sensor which measures a distance to an object to be detected by using a sound (ultrasonic wave) of e.g. 20 kHz or greater. By providing a plurality of ultrasonic sensors at a plurality of positions of a single AGV, it is possible to determine how far and in which direction (angle) the object to be detected is located. A "laser range finder" emits an infrared laser beam, and acquires reflected light thereof to measure a distance and angle to the point of reflection (i.e., the surface of an object to be detected). A "proximity sensor" detects a change in an electric field or magnetic field to detect that an object to be detected is approaching.

Note that the aforementioned sensor may be a camera having an imaging device or an imaging device on the other AGVs 10q and 10r. The reference AGV 10p may be captured by using an imaging device; the reference AGV 10p in the image may be recognized; and the velocity and angle of move may be controlled so that the size of a representation corresponding to the reference AGV 10p and its position on the image are substantially fixed.

As shown in FIG. 27, the reference AGV 10p transmits a request to acquire a guidance command to the file server 40. In response to receiving the request, the file server 40 transmits a guidance command to the reference AGV 10p.

The reference AGV 10p begins traveling in accordance with the guidance command. If the reference AGV 10p moves in the right direction in the figure, the AGVs 10q and 10r also move in the right direction while maintaining their relative positioning with the reference AGV 10p, for example. If the AGV 10p moves in the lower right direction in the figure in accordance with a guidance command, the AGVs 10q and 10r also follow the motion of the reference AGV 10p, thus moving in the lower right direction in the figure.

As described above, when the AGV 10p receives a guidance command from the file server 40, the AGVs 10q and 10r can be operated in synchronization with the AGV 10p, even without acquiring a guidance command. As a result, the amount of communication data for the entire guidance system can be reduced.

Although this example illustrates a case where the AGV 10p operates as a reference AGV, it can be decided in an arbitrary and/or dynamic manner as to which AGV accesses the file server 40. In the example of FIG. 27, the AGV 10q or the AGV 10r may be set as the reference AGV, instead of the AGV 10p.

Moreover, the reference AGV may be switched between a partial section and another partial section of the guidance path. For example, suppose that a path along which a plurality of AGVs reciprocate between two points is determined as a guidance path, in advance. In this case, the AGV 10*p* may be set as a reference AGV in the forward path, whereas the AGV 10*q* or the AGV 10*r* may be set as a reference AGV in the backward path. On the traveling path, the vehicle that is located foremost or rearmost may always be set as a reference AGV. In this case, when the moving direction of each AGV is altered to the opposite direction (i.e., a 180-degree turn), an alteration of the reference AGV may occur. The exemplified angle is only an example, and another angle may be adopted. Moreover, the AGV to be set as a reference AGV does not need to be an AGV that is located foremost or rearmost. An AGV at any location, among the set consisting of the plurality of AGVs, may be selected as a reference AGV. In other words, any AGV may switch to become the reference AGV. When the reference AGV switches, the new AGV notifies another AGV and/or guidance device (including an AGV which has so far been the reference AGV) of preassigned identification data which uniquely identifies itself and the fact that itself is the reference AGV. The notification may be made via the relay devices 32, or made between AGVs via wireless communications. Any other AGV receiving the notification may wait for the reference AGV to travel, without acquiring a guidance command.

On the other hand, the reference AGV may be fixed, and the construction of the reference AGV and the construction of any other AGV may be differentiated. For example, the reference AGV may include a communication circuit, a power source (motor), and a controller (inverter) which controls the power source in accordance with a guidance command to move itself. On the other hand, any other AGV may include a power source, a controller, a sensor, and an arithmetic circuit. The arithmetic circuit of any other AGV may utilize a result of detection by a sensor to generate a control signal for maintaining the relative positioning between itself and other vehicles.

Although an example has been illustrated where any AGV other than the reference AGV directly detects the reference AGV by utilizing a sensor and maintains its relative positioning with the reference AGV, there is no need to directly detect the reference AGV. If one travels while maintaining its relative positioning with other AGVs that are contained in the field of view of the sensor, the entirety of mutual relative positioning will be maintained as a whole, and, consequently, the relative positioning between the reference AGV and any other AGV will be maintained.

The processes by the AGV 110, the guidance device 20, and the positioning device 30 in the aforementioned guidance system 2 are respectively executed by the microcontroller 55 of the AGV 110, the CPU 25 of the guidance device 20, and the CPU 35 of the positioning device 30. These processes may be achieved based on a computer program containing a plurality of instructions. The computer program is laid out on each memory for execution.

The reason for adopting two-dimensional designations as described above is that, the present specification mainly presumes that locations of AGVs which travel on planar floor planes of a factory are to be designated.

However, three-dimensional designations of a moving direction and distance will also be possible.

In the case where the AGV is employed in a factory having a plurality of floors, for example, information designating a floor level may further be added to the guidance command. Alternatively, when a multicopter is adopted as the vehicle as will be described later, an azimuth angle and an angle of elevation may be designated as the moving direction (flying direction), and a flying distance may be designated, in a guidance command. Alternatively, an altitude, and a flying direction and distance on a two-dimensional plane at that altitude, may be designated.

In the above description, the guidance device 20 and the file server 40 are illustrated as separate devices. The reason is to distribute burden by having the guidance device 20 perform the processes of guidance command generation and alteration, and having the file server 40 perform transmission/reception of guidance commands with the AGV 110.

Figure 26:
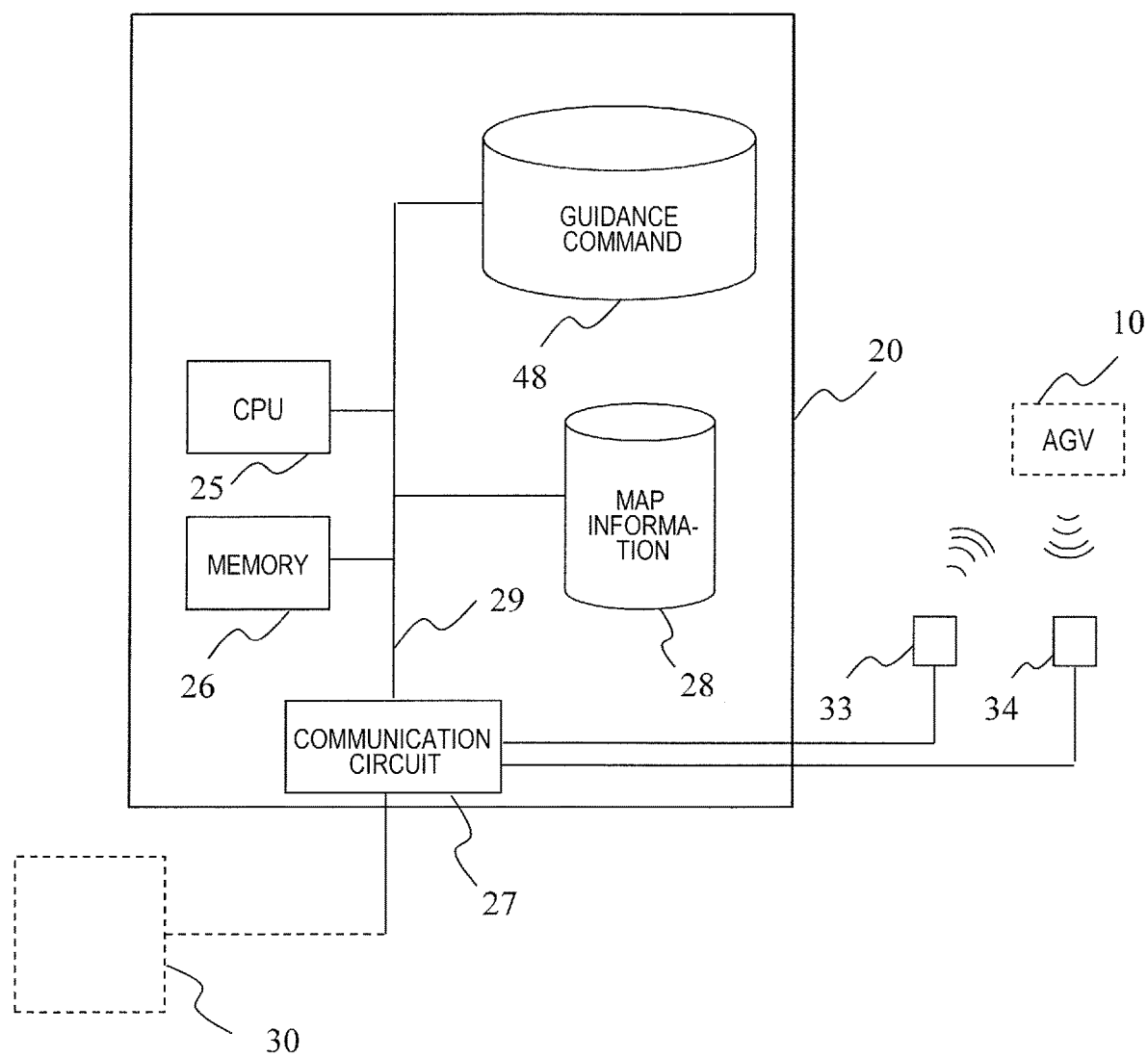
FIG. 26 is a diagram showing an exemplary construction in which the guidance device 20 and the storage device 48 of the file server 40 are accommodated inside a single housing.

However, the guidance device 20 and the file server 40 may be integrated. For example, FIG. 26 shows an exemplary construction in which the guidance device 20 and the storage device 48 of the file server 40 are accommodated inside a single housing. With the construction of FIG. 26, the transmission/reception of altered guidance commands which would otherwise be performed between the guidance device 20 and the file server 40 is accomplished within the guidance device 20, thereby making it unnecessary to transmit or receive notifications of update completion.

The aforementioned guidance system according to the present disclosure can also be used for purposes other than guiding AGVs to be used in a car park and AGVs to be used in a factory.

The AGV is not limited to moving on land with wheels. For example, the AGV may be a multicopter that has three or more rotor blades and flies within a factory.

The aforementioned examples are all instances where the vehicle guidance system is used indoors, e.g., in a car park or a factory. However, the vehicle guidance system according to the present disclosure can also be used outdoors. For example, the vehicle guidance system may be utilized in an outdoor space where use of the GPS (Global Positioning System) is difficult, such as in a space between towering buildings, or in a tunnel. For example, a receiver to receive identification information of the tag, or a transmitter that is capable of transmitting guidance commands, may be provided on wall surfaces, streetlights, trees, etc., so as to guide a vehicle which travels or flies in such an outdoor space by using the vehicle guidance system according to the present disclosure. Note that the vehicle guidance system according to the present disclosure may also be used in situations where the GPS is available for use.

In the above embodiments, AGVs, which are automated guided vehicles, are exemplified as the vehicles. However, the vehicle guidance system according to the present disclosure is also able to guide manned vehicles. The driving power with which the vehicle moves is not limited to being transmitted to wheels. It may be a vehicle that moves by using two or more legs. Furthermore, the vehicle may be an unmanned or manned submersible that moves under water. Measurement of vehicle locations under water can be made by using ultrasonic waves, for example.

The present specification has illustrated examples where various communications are performed between a vehicle and the transmission antennas and reception antenna. The frequency of an electromagnetic waves or an ultrasonic wave that is used for positioning, the frequency that is utilized in communications used for transmitting a state of travel, and the frequency that is utilized in communications for receiving guidance commands may be identical, or two or three (or more) different frequencies. The same is also true of the method of communication. For example, positioning process (a) may utilize electromagnetic waves of a frequency according to the BLE (Bluetooth (registered trademark) Low Energy) standards. Transmission of a state of travel and reception of a guidance command may utilize electromagnetic waves of a frequency according to the Bluetooth (registered trademark) standards, or a frequency in the 2.4 GHz band or the 5 GHz band according to the Wi-Fi (registered trademark) standards.

In accordance with the example illustrated in FIG. 27 above, a vehicle guidance system as described in each Item below can be obtained.

[Item 1]

A vehicle guidance system comprising:
a plurality of vehicles comprising a first vehicle and at least one second vehicle;
a positioning device to measure a location of the first vehicle which is a reference vehicle selected from among the plurality of vehicles, and output location information of the reference vehicle;
a guidance device to generate a guidance command to guide the reference vehicle; and
a storage device to store the guidance command for the reference vehicle,
each vehicle including
a communication circuit to communicate with each of the guidance device and the storage device,
a power source to generate driving power,
a sensor to contactlessly detect an object in surroundings,
an arithmetic circuit to: when the vehicle itself is the reference vehicle, acquire the guidance command from the storage device and generate the control signal in accordance with the guidance command; and, when the vehicle itself is the second vehicle which is a vehicle other than the reference vehicle, use a result of detection by the sensor and generate a control signal for maintaining relative positioning between the vehicle itself and the first vehicle or the other second vehicle, and
a controller to control the power source in accordance with the control signal to move the vehicle itself.

[Item 2]

The vehicle guidance system of Item 1, wherein the sensor is an ultrasonic sensor, a laser range finder, a proximity sensor, or an imaging device.

[Item 3]

The vehicle guidance system of Item 1 or 2, wherein the reference vehicle switches between a first section and a second section of a path along which the plurality of vehicles are to be guided.

[Item 4]

The vehicle guidance system of Item 3, wherein the first section is a forward path and the second section is a backward path.

[Item 5]

The vehicle guidance system of Item 1 or 2, wherein the reference vehicle switches in accordance with location within a set consisting of the plurality of vehicles.

[Item 6]

The vehicle guidance system of Item 5, wherein a vehicle that is located foremost or rearmost is altered into the reference vehicle in accordance with moves of the plurality of vehicles.

[Item 7]

The vehicle guidance system of any of Items 1 to 6, the vehicle which has been altered into the reference vehicle notifies another vehicle and the guidance device of identification data which uniquely identifies the vehicle itself and the fact that the vehicle itself is the reference vehicle.

[Item 8]

A vehicle guidance system comprising:
a plurality of vehicles comprising a first vehicle and at least one second vehicle;
a positioning device to measure a location of the first vehicle and output location information of the first vehicle;
a guidance device to generate a guidance command to guide the first vehicle; and
a storage device to store the guidance command for the first vehicle, wherein,
the first vehicle includes
a first communication circuit to communicate with each of the guidance device and the storage device,
a first power source to generate driving power, and
a first controller to control the power source in accordance with the guidance command to move the first vehicle;
the second vehicle includes
a second power source to generate driving power,
a second controller to control the second power source in accordance with a control signal, to move the vehicle itself,
a sensor to contactlessly detect an object in surroundings, and
an arithmetic circuit to generate the control signal, the arithmetic circuit using a result of detection by the sensor to generate a control signal for maintaining relative positioning between the vehicle itself and the first vehicle or the other second vehicle;
the guidance device includes
a signal processing circuit to generate the guidance command, and
a communication circuit to communicate with each of the storage device and the vehicle;
the guidance device performs
generating the guidance command so as to include location information of a plurality of points of passage defining a traveling path for the first vehicle,
storing the guidance command to the storage device, and, when at least a portion of the plurality of points of passage is to be altered, storing altered location information of points of passage to the storage device; and
the first vehicle accesses the storage device to acquire from the storage device the altered location information of points of passage.

INDUSTRIAL APPLICABILITY

A guidance system according to the present disclosure can be widely used for controlling the location of a vehicle that moves indoors or outdoors.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle guidance system for guiding each of a plurality of vehicles, the vehicle guidance system comprising:
a plurality of vehicles, each of the plurality of vehicles includes a tag with a storage device which stores identification information which uniquely identifies each vehicle of the plurality of vehicles and a transmitter to transmit the identification information;
a positioning device that is provided externally from the plurality of vehicles, the positioning device being configured to measure a location of each vehicle of the plurality of vehicles and output location information of each vehicle of the plurality of vehicles, the positioning device being configured to measure the location of the plurality of vehicles by receiving the identification information transmitted from the transmitter of the tag with an array antenna located in one place, a plurality of antennas including at least one antenna element and located in a plurality of locations, or a plurality of array antennas located in a plurality of locations, wherein the array antenna, the plurality of antennas, and the plurality of array antennas are provided externally from the plurality of vehicles;

a guidance device to generate, for each vehicle of the plurality of vehicles, a guidance command to guide each vehicle of the plurality of vehicles;

a storage device to store a guide command for each vehicle of the plurality of vehicles, each vehicle including: a first communication circuit to communicate with each of the guidance device and the storage device, and a power source to generate driving power; and a controller to control the power source in accordance with the guidance command to move each vehicle of the plurality of vehicles; wherein the guidance device includes:
  a signal processing circuit to generate the guidance command; and
  a second communication circuit to communicate with each of the storage device and each vehicle of the plurality of vehicles;

the guidance device:
  generates the guidance command to include location information of a plurality of points of passage defining a traveling path for each vehicle of the plurality of vehicles;
  stores the guidance command to the storage device; and
  when at least a portion of the plurality of points of passage is to be altered, stores altered location information of points of passage to the storage device;

each vehicle of the plurality of vehicles accesses the storage device to acquire from the storage device the altered location information of points of passage;

the plurality of points of passage include a first point of passage and a second point of passage, the first point of passage and the second point of passage being two adjacent points of passage; and the guidance command is defined a direction and a distance of the second point of passage as beginning from the first point of passage as the location information of the second point of passage.

2. The vehicle guidance system of claim 1, wherein
the guidance device further performs, when the altered location information of points of passage is stored to the storage device, transmitting a notification to a vehicle among the plurality of vehicles on a traveling path that is to be altered by the altered location information of points of passage; and
the vehicle among the plurality of vehicles that receives the notification accesses the storage device to acquire from the storage device the altered location information of points of passage.

3. The vehicle guidance system of claim 2, wherein
before the vehicle among the plurality of vehicles arrives at an expected location of arrival, the second communication circuit of the guidance device stores the altered location information of points of passage to the storage device; and
the vehicle among the plurality of vehicles accesses the storage device to acquire from the storage device the altered location information of points of passage.

4. The vehicle guidance system of claim 1, wherein each of the plurality of vehicles moves in accordance with the guidance command, and, upon arriving at each point of passage, accesses the storage device to acquire from the storage device the altered location information of points of passage.

5. The vehicle guidance system of claim 1, wherein
when the guidance device guides a first vehicle of the plurality of vehicles from a first location, through a second location, to a third location, the signal processing circuit generates the guidance command so as to include location information of the second location as beginning from the first location and location information of the third location as beginning from the second location; and
while the first vehicle is moving from the first location toward the second location based on the guidance command, the signal processing circuit estimates an expected location of arrival of the first vehicle based on a change in the location of the first vehicle as measured by the positioning device, generates location information of the third location as beginning from the expected location of arrival, and alters the second location among the plurality of points of passage.

6. The vehicle guidance system of claim 5, wherein
when the third location is a location of a second vehicle of the plurality of vehicles that is different from the first vehicle or a person, the positioning device measures a location of the second vehicle or the person and outputs location information; and
if the location of the second vehicle or the person has changed, the signal processing circuit of the guidance device, alters the third location among the plurality of points of passage based on the changed location of the another vehicle or the person.

7. The vehicle guidance system of claim 6, wherein when the location of the second vehicle or the person has further changed, based on the changed location of the second vehicle or the person, the signal processing circuit of the guidance device newly adds a fourth location to the plurality of points of passage, the fourth location being subsequent to the third location.

8. The vehicle guidance system of claim 1, wherein
when the guidance device guides a first vehicle of the plurality of vehicles from a first location, through a second location, to a third location, the signal processing circuit generates the guidance command so as to include location information of the second location as beginning from the first location and location information of the third location as beginning from the second location; and
while the first vehicle is moving from the first location toward the second location based on the guidance command, the signal processing circuit estimates an expected location of arrival of the first vehicle based on a change in the location of the first vehicle as measured by the positioning device, and, if the second location and the expected location of arrival are within a predetermined distance, maintains the guidance command.

9. The vehicle guidance system of claim 8, wherein, after a move from the first location to an expected location of arrival is completed, the controller causes the first vehicle to move from the expected location of arrival to the third location in accordance with an altered guidance command.

10. The vehicle guidance system of claim 9, wherein when the guidance device further guides the first vehicle from the third location to a fourth location, the signal processing circuit further estimates a next expected location of arrival of the third vehicle going from the expected location of arrival toward the third location, and generates a third guidance command indicating a moving direction and a moving amount to guide from the next expected location of arrival to the fourth location.

11. The vehicle guidance system of claim 1, wherein the guidance device and the storage device are accommodated inside a single housing.

12. The vehicle guidance system of claim 1, wherein the signal processing circuit estimates an expected location of arrival based on a remaining distance for each vehicle of the plurality of vehicles to move and based on a velocity and direction with and in which each vehicle of the plurality of vehicles moves.

13. The vehicle guidance system of claim 1, wherein each vehicle of the plurality of vehicles includes:
a sensor to detect a physical parameter of attitude, angular velocity, or angular acceleration of each vehicle of the plurality of vehicles, and a control circuit; and
while each vehicle of the plurality of vehicles is moving between two adjacent points of passage, the control circuit computes a deviation from an orientation between the two points of passage based on the physical parameter detected by the sensor, and controls the controller to move each vehicle of the plurality of vehicles so that the deviation is reduced.

14. The vehicle guidance system of claim 13, wherein the sensor includes a gyroscope.

15. The vehicle guidance system of claim 1, wherein
the guidance device retains map information for use in guiding each vehicle of the plurality of vehicles; and
the signal processing circuit generates the guidance command by using the map information.

16. The vehicle guidance system of claim 1, wherein
each vehicle of the plurality of vehicles further includes an alarm device to perform at least one of sound generation and light activation;
the positioning device measures a location of another vehicle of the plurality of vehicles or a person and outputs location information; and
when the another vehicle or the person comes within a predetermined distance, the signal processing circuit of the guidance device adds to the guidance command an instruction to operate the alarm device.

17. A guidance device comprising:
a communication circuit; and
a signal processing circuit; wherein
the signal processing circuit generates a guidance command to guide each of a plurality of vehicles, each of the plurality of vehicles including a tag with a storage device which stores identification information which uniquely identifies each vehicle of the plurality of vehicles and a transmitter to transmit the identification information, the guidance command including location information of a plurality of points of passage defining a traveling path for each vehicle of the plurality of vehicles;
the communication circuit transmits the guidance command to an external storage device, and receives location information of each vehicle of the plurality of vehicles as measured by a positioning device that is provided externally from the plurality of vehicles;
the signal processing circuit alters at least a portion of the plurality of points of passage based on location information of each vehicle of the plurality of vehicles moving in accordance with the guidance command;
the communication circuit transmits altered location information of points of passage to the external storage device;
the plurality of points of passage include a first point of passage and a second point of passage, the first point of passage and the second point of passage being two adjacent points of passage; and
the guidance command is defined by a direction and a distance of the second point of passage as beginning from the first point of passage as the location information of the second point of passage.

18. A vehicle comprising:
a tag with a storage device which stores identification information which uniquely identifies the vehicle and a transmitter to transmit the identification information;
a communication circuit to acquire a guidance command from an external storage device;
a power source to generate driving power; and
a controller to control the power source in accordance with the guidance command to move the vehicle; wherein
the guidance command includes location information of a plurality of points of passage defining a traveling path for the vehicle, the location information defining directions and distances each from a kth point to a (k+1)th point in the plurality of points of passage, wherein "k" is a positive integer;
during a move in accordance with the guidance command, or after arriving at one of the plurality of points of passage, the communication circuit acquires location information of points of passage in which at least a portion of the plurality of points of passage is altered, from the storage device;
the plurality of points of passage include a first point of passage and a second point of passage, the first point of passage and the second point of passage being two adjacent points of passage; and
the guidance command is defined by a direction and a distance of the second point of passage as beginning fro the first point of passage as the location information of the second point of passage.

19. The vehicle of claim 18, wherein, in response to receiving a notification indicating that at least a portion of the plurality of points of passage has been altered, the communication circuit acquires location information of points of passage in which at least a portion of the plurality of points of passage is altered.

20. The vehicle of claim 18, wherein, after arriving at one of the plurality of points of passage, the communication circuit acquires location information of points of passage in which at least a portion of the plurality of points of passage is altered.

* * * * *